US006393169B1

(12) United States Patent
Paniccia et al.

(10) Patent No.: US 6,393,169 B1
(45) Date of Patent: May 21, 2002

(54) METHOD AND APPARATUS FOR PROVIDING OPTICAL INTERCONNECTION

(75) Inventors: Mario J. Paniccia, Santa Clara; Michael T. Morse, Sunnyvale; Valluri R.M. Rao, Saratoga, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/226,783

(22) Filed: Jan. 6, 1999

Related U.S. Application Data

(63) Continuation-in-part of application No. 08/995,277, filed on Dec. 19, 1997, now Pat. No. 6,049,639, and a continuation-in-part of application No. 08/993,786, filed on Dec. 19, 1997, now Pat. No. 6,075,908, and a continuation-in-part of application No. 08/994,980, filed on Dec. 19, 1997, now Pat. No. 6,052,498.

(51) Int. Cl.[7] .............................. G02B 6/12; G02F 1/025
(52) U.S. Cl. ............................................. 385/14; 385/2
(58) Field of Search .................. 385/1–3, 14, 129–132; 438/31, 21, 27, 65, 69, 116; 359/248, 263; 257/98, 432, 434, 436, 447, 460

(56) References Cited

U.S. PATENT DOCUMENTS

| | | | |
|---|---|---|---|
| 4,422,088 A | 12/1983 | Gfeller | |
| 4,695,120 A | 9/1987 | Holder | ......................... 385/14 |
| 4,758,092 A | 7/1988 | Heinrich et al. | ............ 356/364 |
| 4,761,620 A | 8/1988 | Bar-Joseph et al. | |
| 4,865,427 A | 9/1989 | Kingston et al. | |

(List continued on next page.)

OTHER PUBLICATIONS

Miller, DAB: "Reason and Prospects for Dense Optical Interconnections", Presentation by Stanford University Processor, (Oct. 1997).

Sakano, S. et al.: "InGaAsP/InP Monolithic Integrated Circuit with Lasers and an Optical Switch," *Electronics Letters,* 22(11), May 1986.

Mansuripur, M. and Goodman, JW: "Signal and Noise in Magneto–Optical Readout," *J. Appl. Phys.*, 53(6), Jun. 1982.

Alping, A et al.: "Highly Efficient Waveguide Phase Modulator for Integrated Optoelectronics," *Appl. Phys. Lett.,* 48(19), May 1986.

Levitan, SP et al.: "Computer–Aided Design of Free–Space Opto–Electronic Systems," DAC 97, Anaheim, California (1997). (No month available).

Goodman, JW et al.: "Optical Interconnections for VLSI Systems," *Proc. IEEE,* 72(7), Jul. 1984.

Wang, C. et al.: "Ultrafast, All–Silicon Light Modulator," *Optics Letters,* 19(18), Sep. 1994.

Tada, K. and Okada, Y: "Bipolar Transistor Carrier–Injected Optical Modulator/Switch: Proposal and Analysis," *IEEE Electr Dev Ltrs,* 7(11), Nov. 1986.

(List continued on next page.)

*Primary Examiner*—John D. Lee
*Assistant Examiner*—Michael J. Stahl
(74) *Attorney, Agent, or Firm*—Blakely, Sokoloff, Taylor & Zafman LLP

(57) ABSTRACT

A method and an apparatus providing an optical interconnection in an integrated circuit die. In one embodiment, an optical interconnection is used to optically interconnect a waveguide-based optical modulator through the insulating layer and back side of the semiconductor substrate of the integrated circuit die. In one embodiment, an insulating oxide layer is disposed between a semiconductor waveguide optical modulator and the back side of the semiconductor substrate. Optical conduits are disposed in the insulating oxide layer at the locations where light enters and exits the semiconductor waveguide optical modulator. In one embodiment, the optical conduits have indexes of refraction substantially equal to the indexes of refraction of the semiconductor substrate and the semiconductor waveguide optical modulator. Thus, attenuation of the light used to optically couple the semiconductor waveguide optical modulator through the back side of the semiconductor substrate is reduced.

15 Claims, 20 Drawing Sheets

U.S. PATENT DOCUMENTS

| | | | |
|---|---|---|---|
| 4,871,224 A | | 10/1989 | Karstensen et al. |
| 4,917,450 A | | 4/1990 | Pocholle et al. |
| 4,966,430 A | | 10/1990 | Weidel .................... 385/14 |
| 4,990,465 A | * | 2/1991 | Liau et al. |
| 5,061,027 A | | 10/1991 | Richard |
| 5,150,182 A | * | 9/1992 | Capps et al. |
| 5,153,770 A | | 10/1992 | Harris ..................... 359/245 |
| 5,159,700 A | | 10/1992 | Reid et al. |
| 5,198,684 A | | 3/1993 | Sudo |
| 5,282,080 A | * | 1/1994 | Scifres et al. ............ 359/344 |
| 5,362,976 A | * | 11/1994 | Suzuki ..................... 257/81 |
| 5,400,419 A | | 3/1995 | Heinen |
| 5,432,630 A | | 7/1995 | Lebby et al. |
| 5,434,434 A | | 7/1995 | Kasahara et al. ......... 257/84 |
| 5,485,021 A | | 1/1996 | Abe |
| 5,502,779 A | | 3/1996 | Magel |
| 5,568,574 A | | 10/1996 | Tanguay, Jr. et al. ...... 385/14 |
| 5,605,856 A | | 2/1997 | Goosen et al. |
| 5,625,636 A | | 4/1997 | Bryan et al. |
| 5,629,838 A | | 5/1997 | Knight et al. |
| 5,638,469 A | | 6/1997 | Feldman et al. |
| 5,696,862 A | | 12/1997 | Hauer et al. |
| 5,790,730 A | * | 8/1998 | Kravitz et al. ............. 385/49 |
| 5,835,646 A | | 11/1998 | Yoshimura et al. ........ 385/14 |
| 5,864,642 A | | 1/1999 | Chun et al. ................ 385/14 |
| 5,872,360 A | | 2/1999 | Paniccia et al. |
| 5,966,234 A | * | 10/1999 | Ford et al. ............... 359/248 |
| 5,987,196 A | * | 11/1999 | Noble ...................... 385/14 |
| 6,150,188 A | * | 11/2000 | Geusic et al. .............. 438/31 |
| 6,236,786 B1 | * | 5/2001 | Aoki et al. ................ 385/50 |
| 6,243,509 B1 | * | 6/2001 | Chen ........................ 385/14 |

OTHER PUBLICATIONS

Fernando, C. et al: "Si/Si$_{o.85}$/Ge$_{o.15}$/Si P–I–N Waveguide Optical Intensity Modulator," *SPIE,* vol. 2402(131), 1995. (No month available).

Raybon, G., et al.: "A Reconfigurable Optoelectronic Wavelength Converter based on an Integrated Electroabsorption Modulated Laser Array" in 1997 Digest of IEEE/LEOS Summer Topical Meetings, Montreal, Quebec, Canada, Aug. 1997.

Reiley, DJ, and Sasian JM: "Optical Design of a Free–Space Photonic Switching System" in *Applied Optics,* vol. 36(19), Jul. 1997.

Cutolo, A., et al., Silicon Electro–Optic Modulator Based on a Three Terminal Device Integrated in a Low–Loss Single–Mode SOI Waveguide, in *J. of Lightwave Technology,* vol. 15(3), Mar. 1997.

Koren, U., et al.: "A Polarization Insensitive Semiconductor Optical Amplifier with Integrated Electroabsorption Modulators" in *Integrated Photonics Research,* Apr. 29–May 2, 1996 Technical Digest Series, vol. 6, 1996.

Krishnamoorthy, AV, and Miller, DABM: "Free–Space Optical Interconnections for VLSI Systems: A Technology Roadmap", Conference Proceedings Leos '96 9th Annual MeetingU IEEE Lasers and Electro–Optics (vol. 1), Nov. 1996.

Goosen, KW: "GaAs MQW Modulators Integrated With Silicon CMOS" in *IEEE Photonics Technology Letters,* vol. 7(4), Apr. 1995.

"Optoelectronic VLSI Foundry Services From Lucent Technologies," *Lucent Technologies Bell Labs Innovations Web Page* at http://www.bell–labs.com/project/oevsi/, updated Mar. 2, 1997.

"Process for Fabricating OE/VLSI Chips", , Lucent Technologies Bell Labs Innovations Web Page at http://www.bell–labs.com/project/oevsi/wabcproc.html/, updated Sep. 26, 1996.

"Detailed Design Rules for Workshop Chips", , Lucent Technologies Bell Labs Innovations Web Page at http://www.bell–labs.com/project/oevlsi/wdesrule.html, updated Mar. 7, 1997.

Silva, MTC, and Herczfield PR: "Optical Intensity Modulator Based on Electrically Induced Periodic Structure" Optoelectronics and Systems Research Laboratory, Sao Paulo & Center for Microwave and Lightwave Engineering, Drexel Univ., Philadelphia, PA. (No date available).

Kuwamura, Y, et al.: "Analysis of Operating Mechanism in Semiconductor Optical Modulator with Electron–Depleting Absorption Control" in *Electronics and Communications in Japan,* vol. 79(5), Dec. 1995.

Liu, MY and Chou, SY: "High–Modulation–Depth and Short–Cavity–Length Silicon Fabry–Perot Modulator with Two Grating Bragg Reflectors" in *Appl. Phys. Lett.* vol. 68(2), Jan. 1996.

Orobtchouk, R., et al.: "Quasi–TEoo Singlemode Optical Waveguides for Electro–optical Modulation at 1.3$\mu$m Using Standard SIMOX Material" in *IEEE Proc. Optoelectron,* vol. 144(2) Apr. 1997.

Soref, RA: "Electrooptical Effects of Silicon" in *IEEE J. of Quantum Electron.* vol. QE–23(1), Jan. 1997.

Cutolo, A., et al.: "An Electrically Controlled Bragg Reflector Integrated in a Rib Silicon on Insulator Waveguide" in *Appl. Phys. Lett.* vol 71(2), Jul. 1997.

Heinrich, HK: "A Noninvasive Optical Probe for Detecting Electrical Signals in Silicon Integrated Circuits", Doctoral Dissertation, Stanford Univ., (Apr., 1987).

* cited by examiner

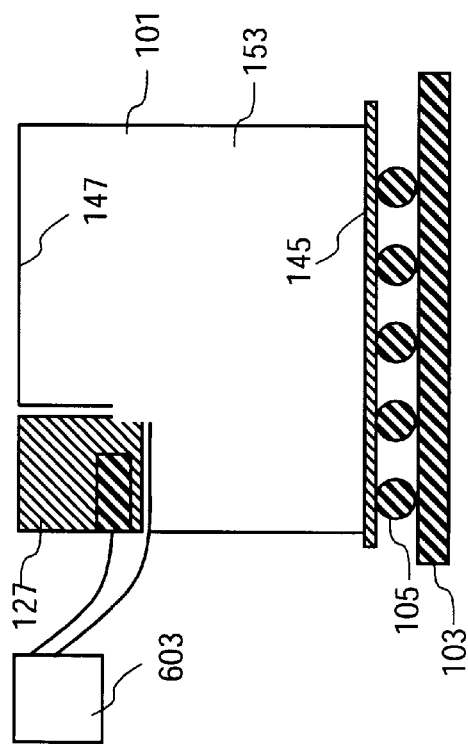
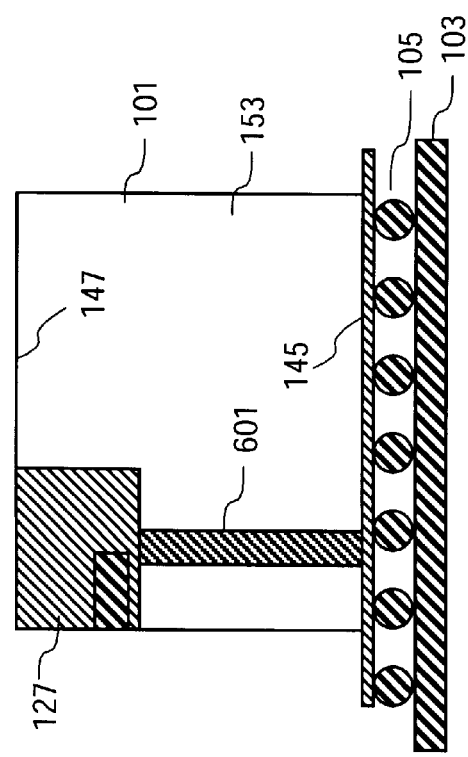
FIG. 6A
FIG. 6B

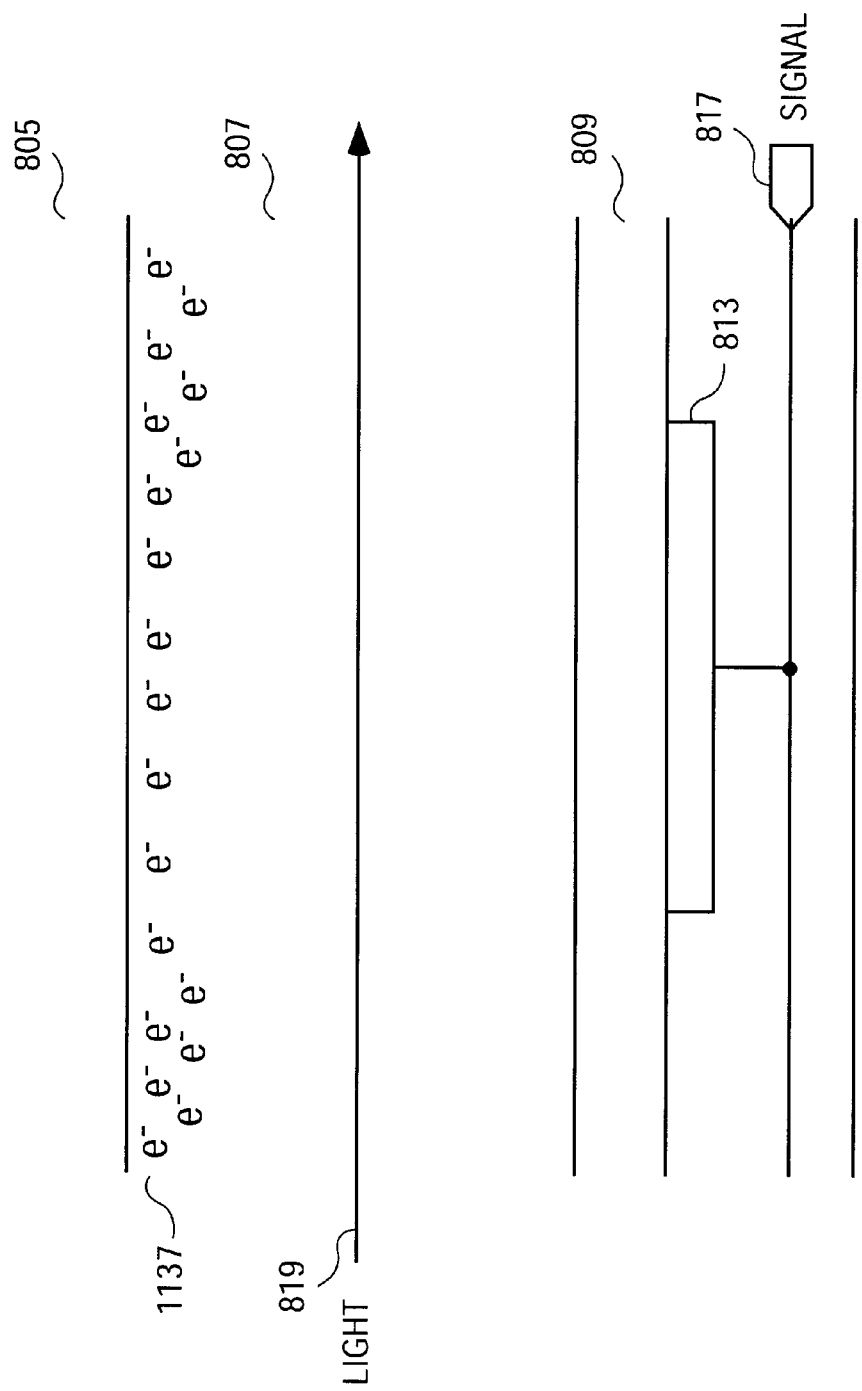

METHOD AND APPARATUS FOR PROVIDING OPTICAL INTERCONNECTION

RELATED APPLICATIONS

This application is CIP of application Ser. No. 08/995,277, now U.S. Pat. No. 6,049,639 entitled "Method and Apparatus Providing Optical Input/Output Through The Back Side Of An Integrated Circuit Die," CIP of application Ser. No. 08/993,786, now U.S. Pat. No. 6,075,908 entitled "Method And Apparatus For Optically Modulating Light Through The Back Side Of An Integrated Circuit Die," and CIP of application Ser. No. 08/994,980, now U.S. Pat. No. 6,052,498 entitled "Method and Apparatus Providing An Optical Input/Output Bus Through The Back Side Of An Integrated Circuit Die," each filed Dec. 19, 1997 and assigned to the Assignee of the present application.

BACKGROUND OF THE INVENTION

1. Field of the Invention

The present invention relates generally to integrated circuit input and/or output and, more specifically, the present invention relates to the optical coupling of integrated circuit inputs and/or outputs.

2. Description of Related Art

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off-chip caches, controllers, etc., is the input/output bandwidth and/or round trip delay between and within chips.

Prior attempts to address the capacitive loading problems associated with increased integrated circuit speeds and device densities have resulted in the use of larger and more powerful integrated circuit input and/or output drivers on the chip. An undesirable consequence of using larger input/output drivers is that the larger input/output drivers generally consume more power, dissipate more heat and occupy more valuable area on the integrated circuit die than smaller integrated circuit input/output drivers.

Other prior attempts to overcome traditional integrated circuit connection limitations have included the use of gallium arsenide (GaAs) technology-based optical interconnection techniques. For example, some approaches use GaAs laser diodes that are electrically modulated and switched. Other approaches use GaAs-built modulators that amplitude modulate a laser beam that passes through an integrated circuit. The modulation used in these prior approaches is based on electroabsorption through strained multi-layer grown molecular beam epitaxy (MBE) films in GaAs integrated circuits.

As can be appreciated by those skilled in the art, it is difficult to combine III-V-based technology, which includes GaAs, with standard silicon-based complementary metal oxide semiconductor (CMOS) technology, for example. Because many integrated circuits in production today and planned for the future use CMOS or other types of non-III-V technology, it may be impractical to use the above-described approaches in many cases.

SUMMARY OF THE INVENTION

An optical interconnection is disclosed. In one embodiment, the optical interconnection includes a semiconductor die having a first insulating layer disposed between a semiconductor substrate and a semiconductor layer. The optical interconnection also includes a first optical conduit disposed in the first insulating layer between the semiconductor substrate and the semiconductor layer to provide an optical path for light to travel through a back side of the semiconductor substrate, through the first optical conduit and through the semiconductor layer.

Additional features and benefits of the present invention will become apparent from the detailed description, figures and claims set forth below.

BRIEF DESCRIPTION OF THE DRAWINGS

The present invention is illustrated by way of example and not limitation in the accompanying figures.

FIG. 6A shows a cross-section of a light source embedded into the back side of the semiconductor substrate in accordance with one embodiment.

FIG. 6B shows a cross-section of a light source embedded into the back side of the semiconductor substrate in accordance with another embodiment.

FIG. 11A shows a cross-section of one embodiment of the waveguide optical modulator of FIG. 8 operating in depletion mode.

DETAILED DESCRIPTION

A method and an apparatus for providing optical input and/or output (input/output) in an integrated circuit is disclosed. In the following description numerous specific details are set forth in order to provide a thorough understanding of the present invention. It will be appreciated by one having ordinary skill in the art that the specific details need not be employed to practice each embodiment of the present invention. In other instances, well-known materials or methods have not been described in detail in order to avoid obscuring the present invention.

Embodiments of the present invention enable optical communication of input/output signals, including bus signals, in an integrated circuit by optically communicating input/output signals between integrated circuit nodes. In one embodiment, input/output signals are optically routed back and forth through the back side of a semiconductor substrate of an integrated circuit using silicon-based technology. In another embodiment, one or more optical conduits are provided to route optical signals through an insulating oxide layer to a waveguide optical modulator disposed in an integrated circuit die. By communicating input/output signals optically, loading problems typically associated with electrical communication of input/output signals may be reduced enabling increased bandwidth while using smaller input/output drivers. Other features and advantages will be appreciated from the description that follows.

Figure 1A:
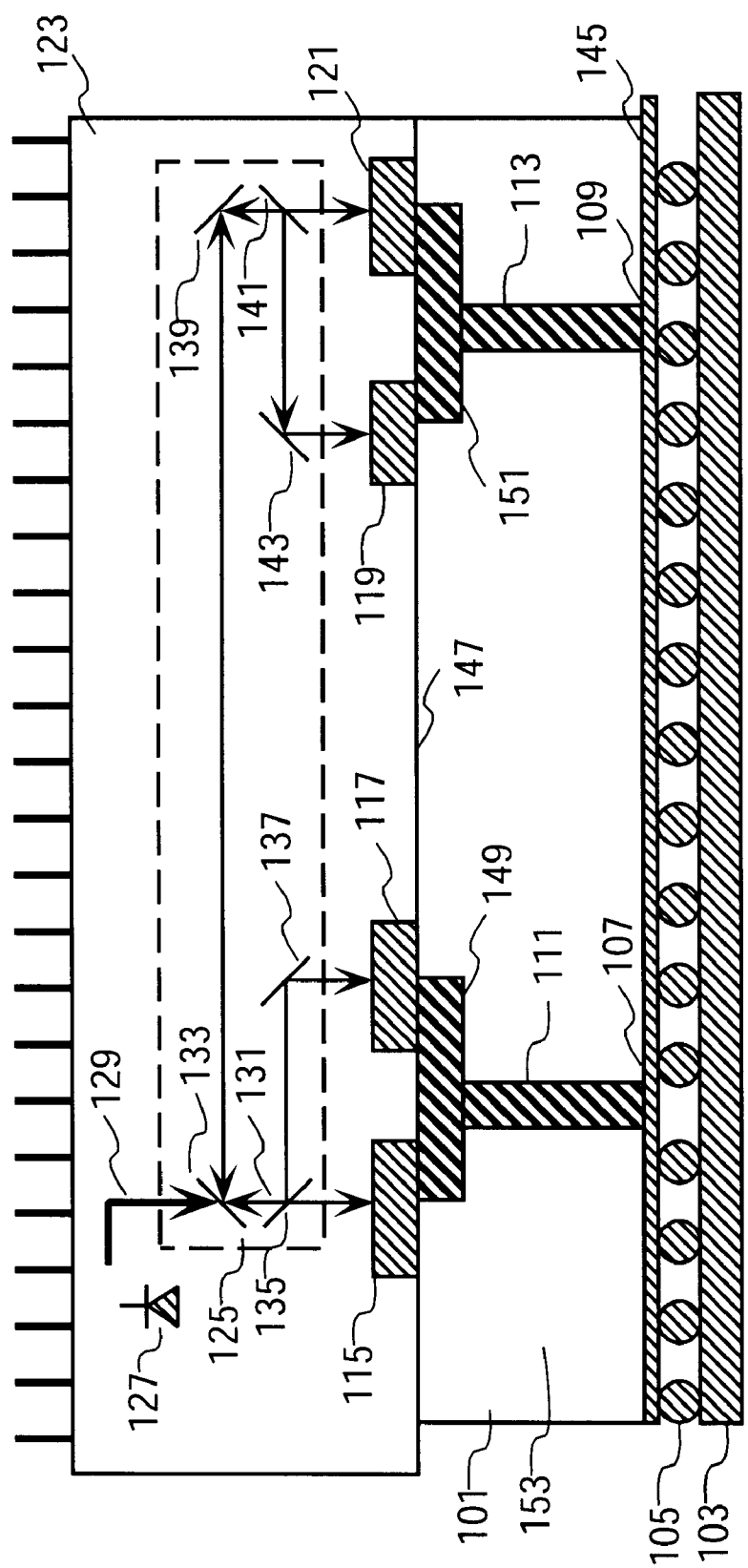
FIG. 1A shows a cross-section of an integrated circuit die and an attached heat sink implementing an optical input/output approach in accordance with one embodiment.

FIG. 1A is an illustration of an integrated circuit die 101 including an optical input/output implementation in accordance with one embodiment. In one embodiment, integrated circuit die 101 is included in a controlled collapse chip connect (C4) or flip chip-package and coupled to package substrate 103 through ball bonds 105. As can be appreciated by those skilled in the art, flip chip packaging provides full access to the back side 147 of integrated circuit die 101. Other approaches that provide access to the backside of an integrated circuit die are within the scope of various embodiments. Further, for one embodiment, integrated circuit die 101 is fabricated using a complementary metal oxide semiconductor (CMOS) process typically used today to fabricate microprocessors and other integrated circuit devices. For another embodiment, integrated circuit die 101 is fabricated using another type of technology which may, for example, be another type of non-III-V technology.

In one embodiment, integrated circuit die 101 includes first and second integrated circuit nodes 107 and 109. As shown in FIG. 1A, electrical input/output signals at first integrated circuit node 107 are transferred back and forth between the front side 145 and back side 147 of integrated circuit die 101 through a first via 111 in the semiconductor substrate 153. Similarly, electrical input/output signals at second integrated circuit node 109 are transferred back and forth between the front side 145 and back side 147 of integrated circuit die 101 through a second via 113 in the semiconductor substrate.

In one embodiment, first and second vias 111 and 113 are etched or micro-machined from the back side 147 of flip chip packaged integrated circuit die 101. Vias 111 and 113 may then be filled or coated with a conductive material, such as, for example but not limited to, aluminum, copper, platinum, gold, etc. For one embodiment, first and second back side pads 149 and 151 are disposed on the back side 147 and coupled to vias 111 and 113, respectively. Back side pads 149 and 151 include a conductive material such as, for example, those listed above.

In one embodiment, a thermal conductor or heat sink 123 is coupled to back side 147 of integrated circuit die 101, as shown in FIG. 1A. The heat sink may be thermally coupled to the integrated circuit die 101 using known techniques. The heat sink 123 is also optically coupled to the integrated circuit die 101 in the manner described below.

The heat sink 123 of one embodiment includes a first optical modulator 115 and a first optical demodulator 117 coupled to first back side pad 149 and a second optical demodulator 119 and a second optical modulator 121 coupled to second back side pad 151.

In one embodiment, first and second optical modulators 115 and 121 and first and second optical demodulators 117 and 119 use electro-optic crystals, or other well-known devices to modulate and demodulate light. In another embodiment, first and second optical modulators 115 and 121 use other semiconductor-based optical modulating techniques, such as, for example but not limited to, silicon-based optical modulation, polysilicon-based optical modulation, waveguide-based optical modulation, plasma optical modulation, etc. Embodiments of waveguide-based optical modulators in accordance with the teachings of the present invention are discussed below in connection with FIGS. 8–12B.

Further, for one embodiment, first and second optical demodulators 117 and 119 use known optical demodulation techniques, such as for example but not limited to, an active diffusion photo-diode. It is noted that other optical modulator and demodulators that may be used to optically couple integrated circuit input/outputs are described in co-pending application Ser. No. 08/993,786, now U.S. Pat. No. 6,075,908 filed Dec. 19, 1997, entitled "Method And Apparatus For Optically Modulating Light Through The Back Side Of An Integrated Circuit Die," and assigned to the Assignee of the present application.

With continuing reference to FIG. 1A, the heat sink 123 of one embodiment also includes an optical assembly 125 and a light source 127 that generates a light beam. The light source may be a laser diode, for example, although other types of light sources are within the scope of various embodiments. The optical assembly 125 includes elements 131, 133, 135, 137, 139, 141 and 143 that optically couple light source 127, first and second optical modulators 115 and 121, and first and second optical demodulators 117 and 119.

For one embodiment, in order to optically couple the optical assembly 125 and the modulators 115 and 121 and the demodulators 117 and 119, the heat sink 123 includes a material that is optically transparent to the light beam from light source 127. In one embodiment, the optically transparent material includes diamond, silicon carbide, or the like. Alternatively, the heat sink 123 may include line-of-sight passages that enable optical coupling of the various elements disposed in the heat sink or may provide optical coupling in a different manner. In one embodiment, known passive alignment techniques are used to align heat sink 123 with integrated circuit die 101.

In operation, light source 127 generates a light beam 129, which is received by optical assembly 125. In one embodiment, light source 127 is a laser diode. In the embodiment shown in FIG. 1A, light beam 129 passes through first and second beam splitters and/or deflectors (splitters/deflectors) 133 and 135 and is directed to first optical modulator 115. Optical modulator 115 modulates light beam 129 in response to an electrical output signal at integrated circuit node 107 to produce a modulated light beam 131.

The modulated light beam 131 is deflected back through second beam splitter/deflector 135 to first beam splitter/deflector 133 where at least a portion of the modulated deflected light beam 131 is deflected to a fourth beam splitter/deflector 139. The fourth beam splitter/deflector further deflects modulated deflected light beam 131 to a fifth beam splitter/deflector 141, which deflects modulated deflected light beam 131 to a sixth beam splitter/deflector 143. The sixth beam splitter/deflector then directs modulated deflected light beam 131 to second optical demodulator 119.

Second optical demodulator 119 then demodulates the modulated deflected light beam 131 to produce an electrical input signal to be received at second integrated circuit node 109 through via 113. The electrical input signal received by the integrated circuit 109 corresponds to the electrical output signal produced at the integrated circuit node 107.

Alternatively, or in addition to the above optical input/output signal communication, a portion of light beam 131 may also pass through fifth beam splitter/deflector 141 which directs deflected light beam 131 to second optical modulator 121. Second optical modulator 121 then modulates deflected light beam 131 in response to an electrical output signal at second integrated circuit node 109. The deflected light beam 131 that has been modulated and deflected from second optical modulator 121 is then directed to the first optical demodulator 117 by the fifth, fourth, first, second and third beam splitters/deflectors 141,139,133,135, and 137, respectively. Optical demodulator 117 then demodulates the thus modulated deflected beam 131 to produce and electrical input signal at first integrated circuit node 107. The electrical input signal produced at the first integrated circuit node corresponds to the electrical signal output at the second integrated circuit node 109.

In the above-described manner, input and/or output signals may be optically communicated between first and second integrated circuit nodes 107 and 109.

Figure 1B:
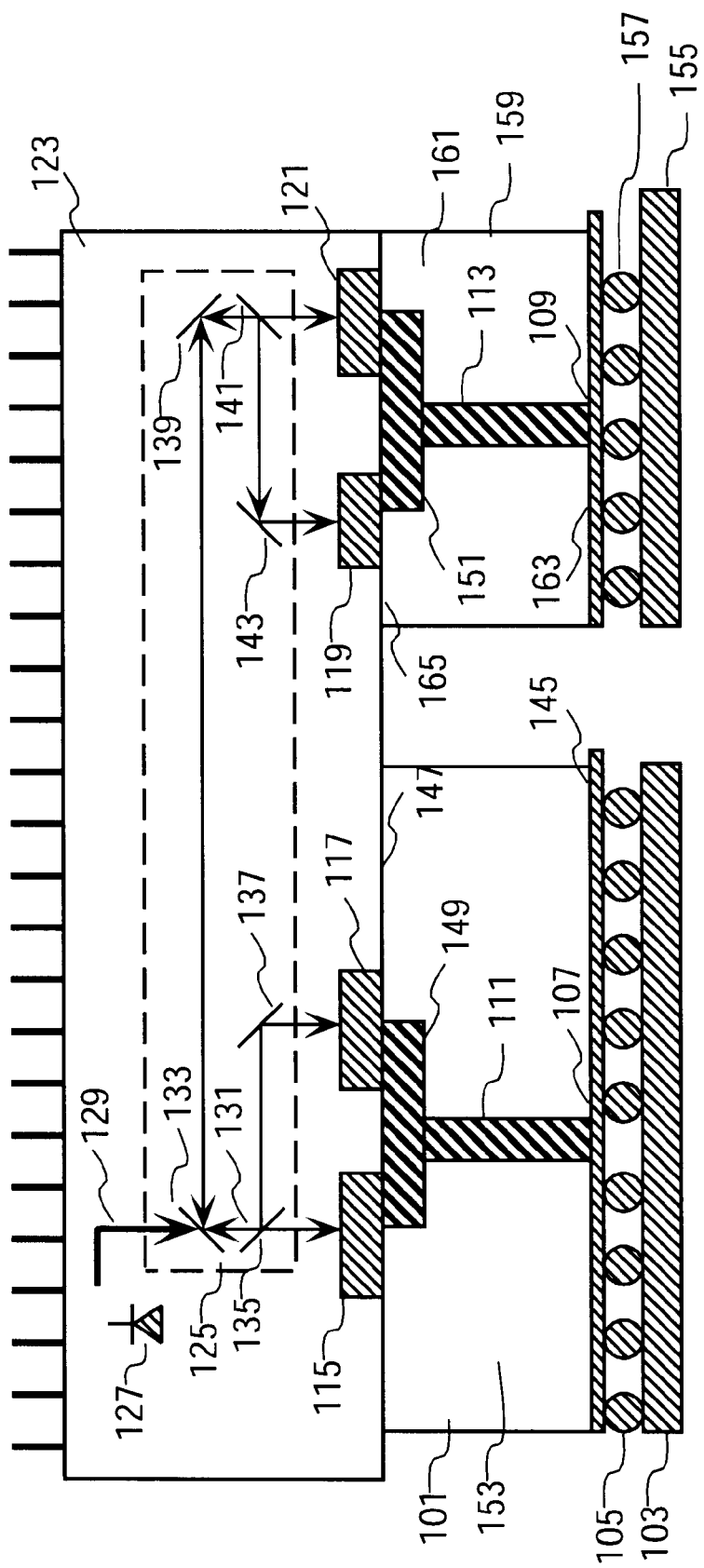
FIG. 1B shows a cross-section of a plurality of integrated circuit dice and an attached heat sink that, together, implement an optical input/output approach in accordance with one embodiment.

For another embodiment, input/output signals may also be optically communicated between or among two or more integrated circuit devices. An example of such an embodiment is shown in FIG. 1 B. As shown in FIG. 1B, a first integrated circuit die 101 is coupled to a first package substrate 103 through ball bonds 105. A second integrated circuit die 159 is coupled to a second package substrate 155 through ball bonds 157. While the first and second integrated circuit dice 101 and 159 are included in separate flip chip packages in this example, other approaches that provide access to the back side of integrated circuit chips may also be used for various embodiments. Further, for some embodiments, the first and second integrated circuit dice may be included in a same package.

The first and second integrated circuit dice 101 and 159 may each be any type of integrated circuit device. For example, the first integrated circuit die 101 may be a central processing unit (CPU) and second integrated circuit die 159 may be an off-chip cache. Various embodiments are also applicable to multiprocessor connections, multichip modules (MCMs), and/or processor card technology.

With continuing reference to FIG. 1B, input/output signals are communicated between the node 107 in the integrated circuit die 101 and the node 109 in the integrated circuit die 159 in a manner similar to that described in reference to FIG. 1A for the single integrated circuit die 101.

Figure 2A:
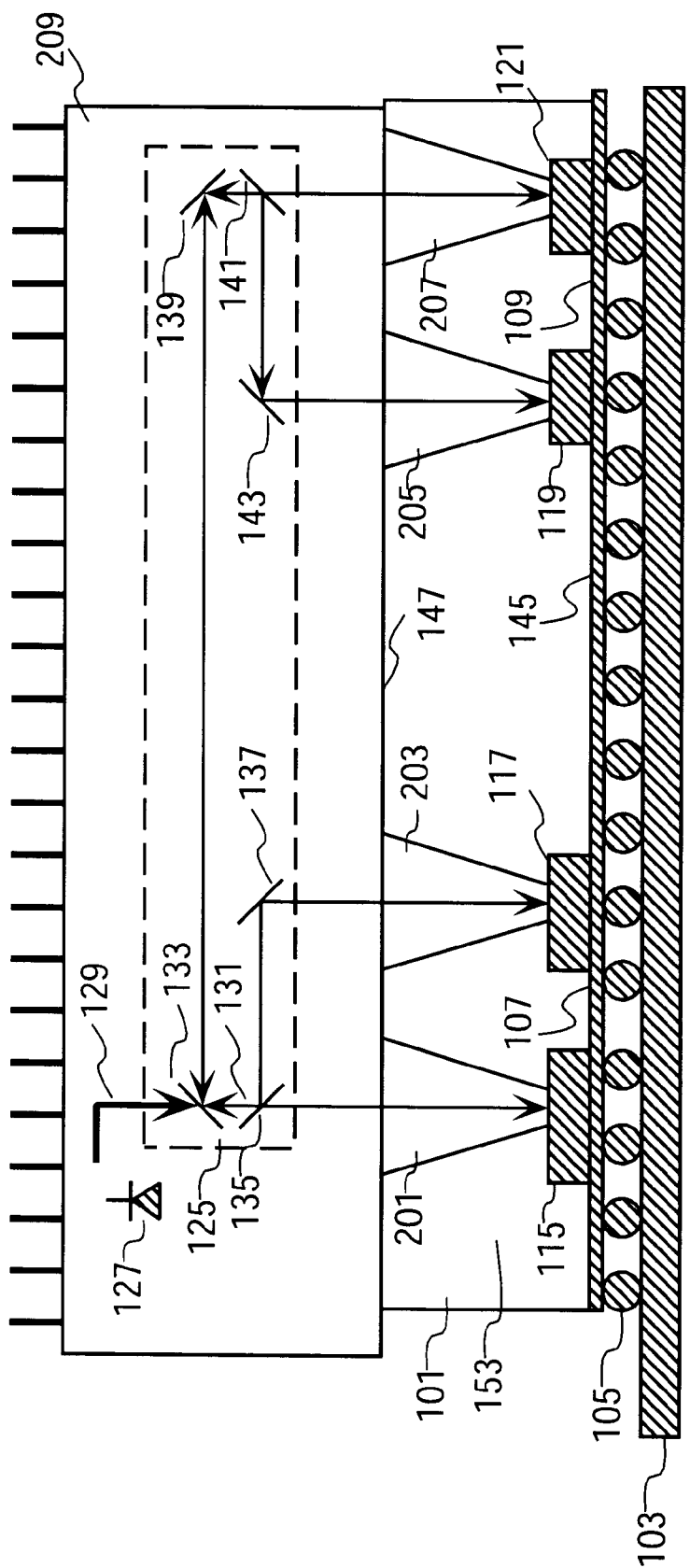
FIG. 2A shows a cross-section of an integrated circuit die with optical modulators and demodulators disposed in trenches and an attached heat sink implementing optical input/output in accordance with one embodiment.
Figure 2B:
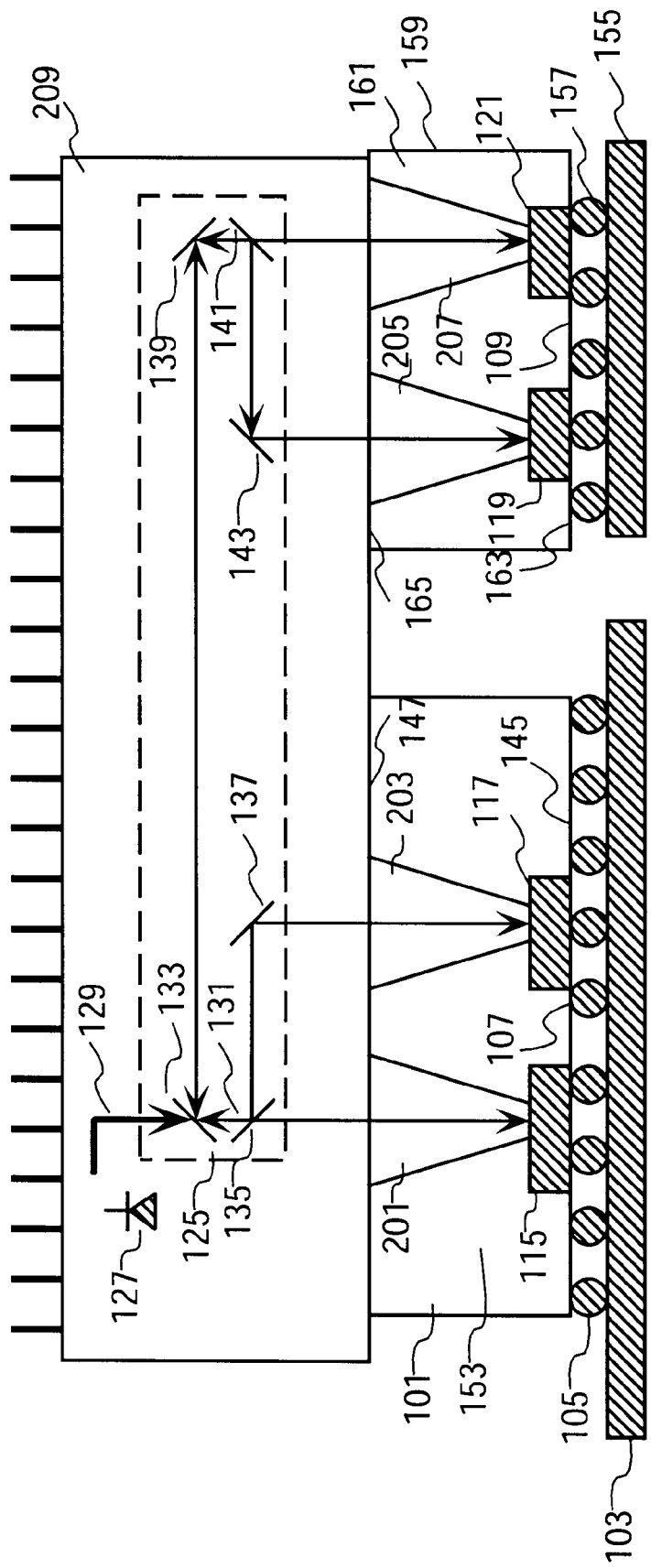
FIG. 2B shows a cross-section of a plurality of integrated circuit dice with optical modulators and demodulators disposed in trenches and an attached heat sink implementing optical input/output in accordance with one embodiment.

For other embodiments, instead of providing optical modulators 115 and 121 and optical demodulators 117 and 119 in a heatsink, optical modulators 115 and 121 and optical demodulators 117 and 119 may be included in the one or more integrated circuit die 101 and/or 159 for which input/output signals are to be optically communicated. FIGS. 2A and 2B illustrate examples of such embodiments.

Referring first to FIG. 2A, semiconductor substrate 153 of integrated circuit die 101 includes first, second, third and fourth recesses 201, 203, 205 and 207, respectively. In one embodiment, first, second, third and fourth recesses 201, 203, 205 and 207 are etched or micro-machined directly into semiconductor substrate 153 from a back side 147 of integrated circuit die 101 as shown in FIG. 2A using known techniques. In one embodiment, first optical modulator 115 is disposed in first recess 201, first optical demodulator 117 is disposed in second recess 203, second optical demodulator 119 is disposed in third recess 205 and second optical modulator 121 is disposed in fourth recess 207.

First optical modulator 115 and first optical demodulator 117 are coupled to a first integrated circuit node 107, and second optical demodulator 119 and second optical modulator 121 are coupled to a second integrated circuit node 109 in integrated circuit die 101. The optical modulators 115 and 121 and optical demodulators 117 and 119 correspond to and operate in a similar manner to the optical modulators and demodulators of FIGS. 1A and 1B.

In one embodiment, first, second, third and fourth recesses 201, 203, 205 and 207 are filled with an optically transparent material, such as for example but not limited to glass. In this manner, the recesses 201, 203, 205 and 207 form optical passages such that the first optical modulator 115, first optical demodulator 117, second optical demodulator 119 and second optical modulator 121 may be optically coupled as described in more detail below.

In one embodiment, a thermal conductor or heat sink 209 is thermally and optically coupled to back side 147 of integrated circuit die 101 in a manner similar to the heat sink 123 of FIGS. 1A and 1B. The heat sink 209, however, is optically coupled to the optical modulators 115 and 121 and demodulators 117 and 119 that are disposed in the integrated die 101. Further, heat sink 209 is similar to heat sink 123 of FIGS. 1A and 1B insofar as heat sink 209 also includes a light source 127 and an optical assembly 125. Heat sink 209 of FIG. 2A, however, does not include optical modulator(s) or demodulator(s).

In operation, input/output signals are communicated between the integrated circuit nodes 107 and 109 in a manner similar to that described above for FIGS. 1A in 1B. For the embodiment shown in FIG. 2A, however, light beams directed to the modulator 115 and/or 121 are modulated in response to electrical signal(s) at the corresponding node 107 and/or 109, respectively, and then directed back through the corresponding optical passage(s) 201 and/or 207 to the optical assembly 125.

Similarly, a modulated light beam 131 directed to one or more of the optical demodulator(s) 117 and/or 119, after being appropriately split and/or deflected by the optical assembly 125, passes through the corresponding recess 203 and/or 205 before reaching the demodulator 117 and/or 119.

FIG. 2B shows another embodiment in which an approach similar to that shown in FIG. 1B is used to optically communicate input/output signals between or among two or more integrated circuit devices such as the integrated circuit devices 101 and 159.

For another embodiment, a light source may be used that generates infrared or near infra-red light. Where such a light source is used, it is not necessary to provide the optically transparent recesses of FIGS. 2A and 2B. This is because silicon is partially transparent to infrared light and thus infrared light beams can be communicated to modulator(s) and/or demodulator(s) through the silicon substrate. Examples of such embodiments are shown in FIGS. 3A and 3B.

Figure 3A:
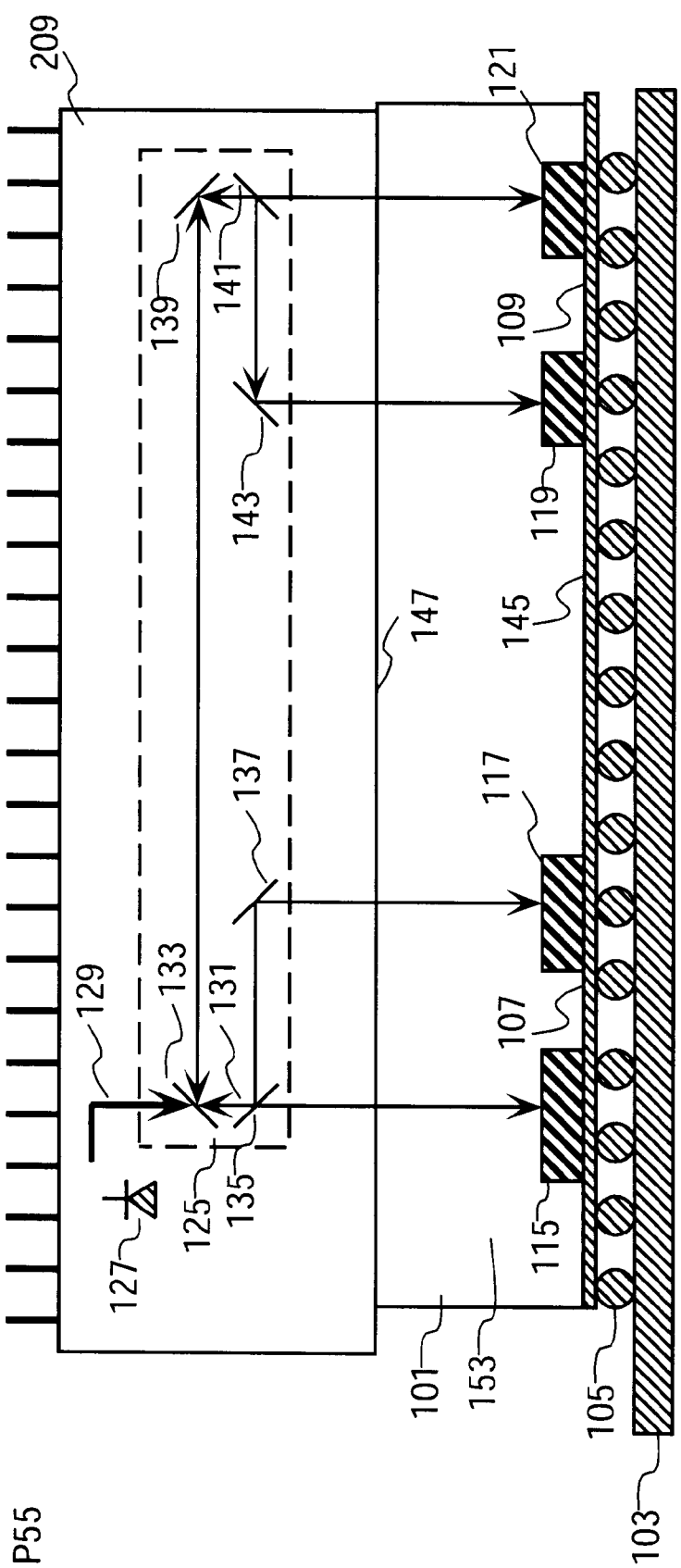
FIG. 3A shows a cross-section of an integrated circuit die with optical modulators and demodulators disposed within the semiconductor substrate and an attached heat sink implementing optical input/output in accordance with one embodiment.
Figure 3B:
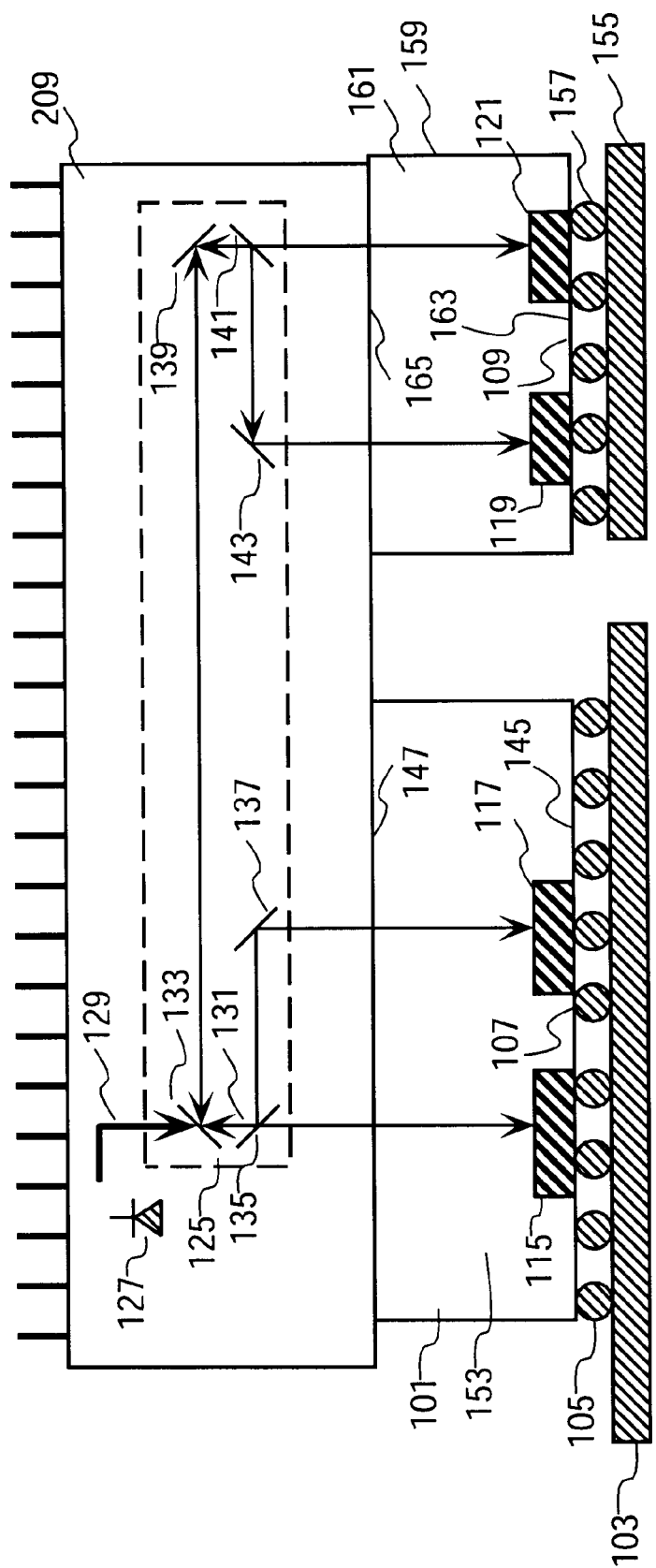
FIG. 3B shows a cross-section of a plurality of integrated circuit dice with optical modulators and demodulators disposed within a semiconductor substrate and an attached heat sink implementing optical input/output in accordance with one embodiment.

The integrated circuit die 101 of FIG. 3A includes a semiconductor substrate 153 that is silicon-based. For one embodiment, the substrate 153 is fabricated using presently available CMOS technology.

Thermal conductor or heat sink 209 of FIG. 3A is similar to heat sink 209 of FIGS. 2A and 2B insofar as heat sink 209 of FIG. 3A also includes a light source 127 and an optical assembly 125. However, in the embodiment illustrated in FIG. 3A, light source 127 generates infrared light. For example, in one embodiment, light source 127 is an infrared laser diode.

In operation, light source 127 generates an infrared light beam 129, which is received by optical assembly 125. In the embodiment shown in FIG. 3A, light beam 129 is directed in the manner described above to one or more of the first optical modulator 115, the second optical modulator 121, the first optical demodulator 117 and/or the second optical demodulator 119 through the back side 147 of the semiconductor substrate 153, which in this embodiment, is partially transparent to infrared light. In one embodiment, semiconductor substrate 153 includes heavily doped silicon, which is partially transparent to infrared light. In one embodiment, the infrared light utilizes sub silicon bandgap photon energies such that the infrared light has a wavelength $\lambda$ greater than 1 $\mu$m.

The optical modulators and demodulators 115, 121, 117 and 119 and the optical assembly of FIG. 3A correspond to and operate in a manner similar to that described above in reference to FIGS. 1A, 1B, 2A and 2B to optically communicate input/output signals between the nodes 107 and 109.

As shown in FIG. 3B, the approach described above with reference to FIG. 3A may also be used to optically communicate input/output signals between or among two or more integrated circuit devices such as the integrated circuit devices 101 and 159 of FIG. 3B.

Figure 3C:
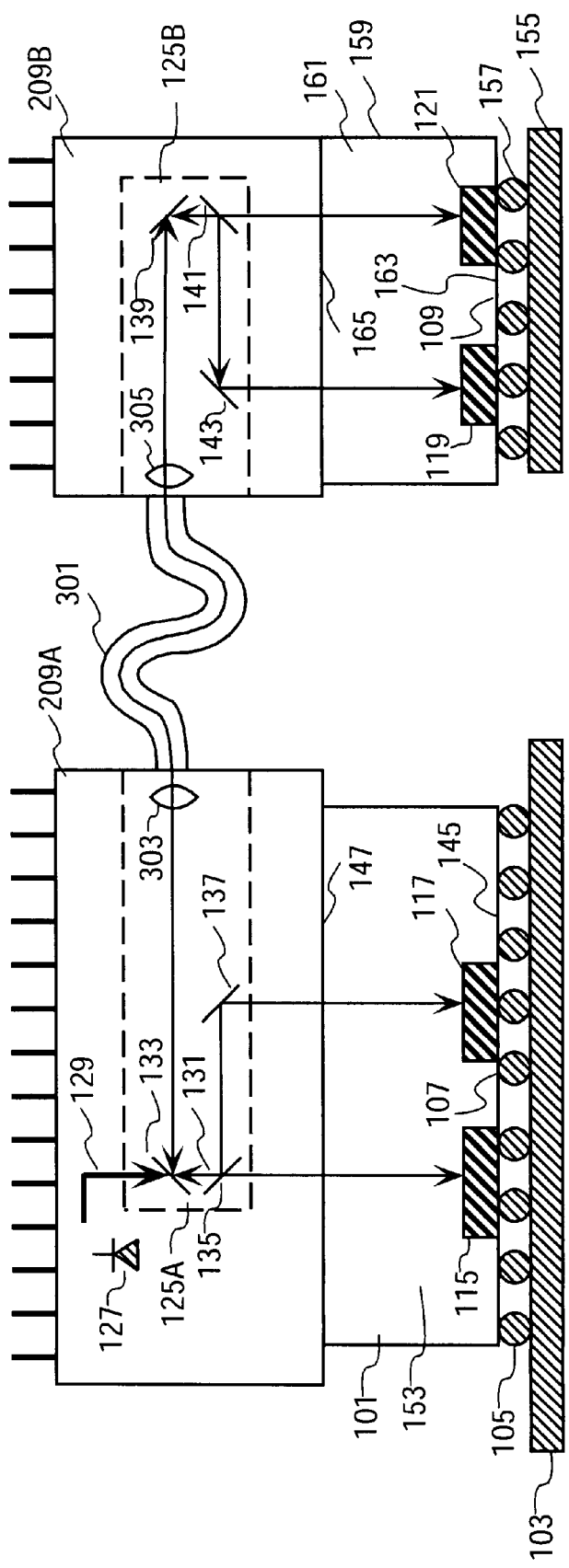
FIG. 3C shows a cross-section of a plurality of integrated circuit dice with optical modulators and demodulators disposed within a semiconductor substrate and attached heat sinks implementing optical input/output using an optical fiber in accordance with one embodiment.

FIG. 3C is a cross-section of still another embodiment of the present invention to optically communicate input/output signals between or among two or more integrated circuit devices such as the integrated circuit devices 101 and 159 of FIG. 3C. In particular, FIG. 3C shows integrated circuit die 101 thermally coupled to heat sink 209A and integrated circuit die 159 thermally coupled to heat sink 209B. Heat sink 209A includes optical assembly 125A and heat sink 209B includes optical assembly 125B. As shown in FIG. 3C, optical assemblies 125A and 125B are optically coupled through an optical fiber 301, which is optically coupled between a lens 303 and a lens 305. It is appreciated that heat sinks 209A and 209B of FIG. 3C together correspond to heat sink 209 of FIG. 3B. Similarly, optical assemblies 125A and 125B, with optical lenses 303 and 305 and optical fiber 301, of FIG. 3C together correspond to optical assembly 125 of FIG. 3B.

In operation, light source 127 generates a light beam 129, which is received by optical assembly 125A. In one embodiment, light beam 129 passes through first and second beam splitters and/or deflectors (splitters/deflectors) 133 and 135 and is directed to first optical modulator 115. Optical modulator 115 modulates light beam 129 in response to an electrical output signal at integrated circuit node 107 to produce a modulated light beam 131.

The modulated light beam 131 is deflected back through second beam splitter/deflector 135 to first beam splitter/deflector 133 where at least a portion of the modulated deflected light beam 131 is deflected to lens 303. The modulated light beam 131 is then directed into and through optical fiber 301 through lens 305 in optical assembly 125B of heat sink 209B. Lens 305 directs the modulated light beam 131 to a fourth beam splitter/deflector 139. The fourth beam splitter/deflector further deflects modulated deflected light beam 131 to a fifth beam splitter/deflector 141, which deflects modulated deflected light beam 131 to a sixth beam splitter/deflector 143. The sixth beam splitter/deflector then directs modulated deflected light beam 131 to second optical demodulator 119.

Second optical demodulator 119 then demodulates the modulated deflected light beam 131 to produce an electrical input signal to be received at second integrated circuit node 109 through via 113. The electrical input signal received by the integrated circuit 109 corresponds to the electrical output signal produced at the integrated circuit node 107.

Alternatively, or in addition to the above optical input/output signal communication, a portion of light beam 131 may also pass through fifth beam splitter/deflector 141 which directs deflected light beam 131 to second optical modulator 121. Second optical modulator 121 then modulates deflected light beam 131 in response to an electrical output signal at second integrated circuit node 109. The deflected light beam 131 that has been modulated and deflected from second optical modulator 121 is then directed to the first optical demodulator 117 by the fifth beam splitters/deflector 141, the fourth beam splitters/deflector, 139, lens 305, optical fiber 301, lens 303, and the first, second and third beam splitters/deflectors 133,135, and 137, respectively. Optical demodulator 117 then demodulates the thus modulated deflected beam 131 to produce and electrical input signal at first integrated circuit node 107. The electrical input signal produced at the first integrated circuit node corresponds to the electrical signal output at the second integrated circuit node 109.

In the above-described manner, input and/or output signals may be optically communicated between first and second integrated circuit nodes 107 and 109 of FIG. 3C.

For other embodiments, the optical assemblies 125, 125A and 125B, and light source 127 may be embedded in one or more integrated circuit devices for which it is desirable to optically communicate input/output signals. An example of such an embodiment is shown in FIG. 5.

Figure 5:
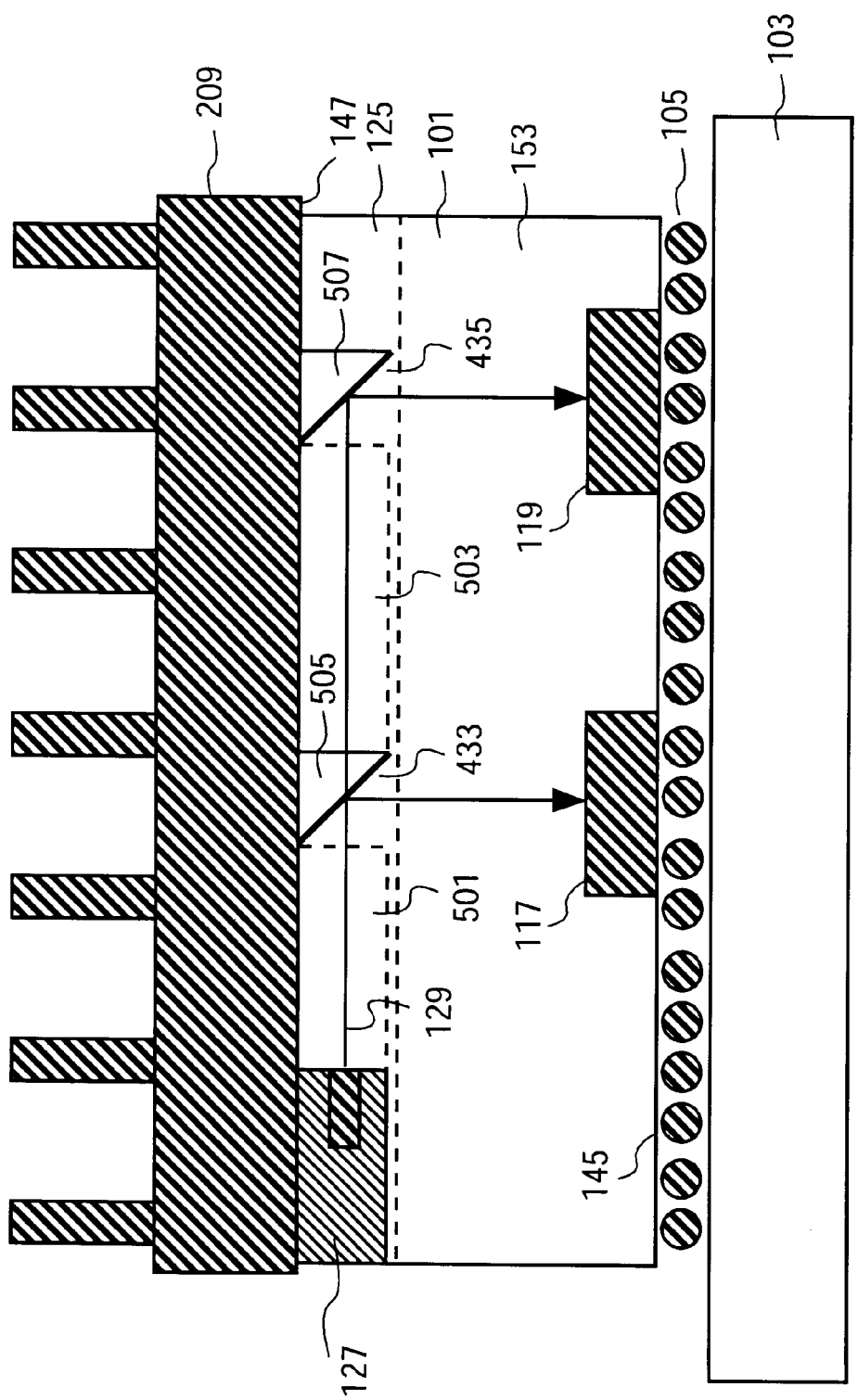
FIG. 5 shows a cross-section of an integrated circuit die with a light source and an optical assembly embedded within the back side of a semiconductor substrate in accordance with another embodiment.

The integrated circuit die 101 FIG. 5 includes a semiconductor substrate 153. For one embodiment, the semiconductor substrate 153 is a silicon-based semiconductor substrate such that it is at least partially transparent to infrared and/or near infra-red light. Optical input and/or output (input/output) devices 117 and 119 are disposed within the integrated circuit die 101 and each coupled to one or more electrical nodes (not shown) on the integrated circuit die. The input/output devices 117 of one embodiment may be optical demodulators similar to the optical demodulators 117 and 119 described above.

Also, in one embodiment, a standard thermal conductor or heat sink 209 may be thermally coupled to back side 147 of integrated circuit die 101 to help cool integrated circuit die 101 during operation. The standard thermal conductor 209 of FIG. 5 does not include an optical assembly or light source.

As shown in FIG. 5, in one embodiment an optical assembly 125 and light source 127 are embedded and integrated directly within the semiconductor substrate 153 on the back side 147 of integrated circuit die 101. In the embodiment illustrated in FIG. 5, optical assembly 125 includes first and second beam splitters/deflectors 433 and 435, respectively and light source 127 generates an infrared light beam 129.

In operation, the infrared light beam 129 from the light source 127 is directed to first beam splitter/deflector 433 which splits the light beam 129. In this manner, at least a portion of light beam 129 is directed to optical input/output device 117 through semiconductor substrate 153 from back side 147. At least a portion of light beam 129 also passes through first beam splitter/deflector 433 and is directed to second beam splitter/deflector 435. Second beam splitter/deflector 435 then directs light beam 129 to optical input/output device 119 through semiconductor substrate 153 from back side 147.

In one embodiment, light source 127 includes a separately manufactured laser strip diode that is attached onto the back side 147 of integrated circuit die 101. Light source 127 may be attached to one side of integrated circuit die 101 into a micro-machined or etched area of the back side 147 of the semiconductor substrate 153. With light source 127 directly attached to the back side 147, as shown, light source 127 may be cooled from both the bottom and top side by the semiconductor substrate 153 and heat sink 209, respectively.

In one embodiment a channel 501 is disposed between light source 127 and first beam splitter/deflector 433, and a channel 503 is disposed between first beam splitter/deflector 433 and second beam splitter/deflector 435. In one embodiment, channels 501 and 503 may be etched or micro-machined into the back side 147. As a result, light beam 129 may travel along back side 147 in channels 501 and 503 in free space without having to travel through semiconductor substrate 153.

In one embodiment, channels 501 and 503 are back-filled with an infrared transparent material. In one embodiment,. channels 501 and 503 are back filled with polysilicon, chemical vapor deposition (CVD) grown diamond, optical fiber waveguides, polymer films, or other similar infrared- or near infrared-transparent materials. The use of channels 501 and 503 enables a reduction in the amount of infrared absorption by the silicon substrate 153 thereby improving the efficiency of the infrared laser power of light source 127.

As shown in FIG. 5, first and second beam splitters/deflectors 433 and 435 are fabricated directly into the back side 147 of integrated die 101. In one embodiment, first and second beam splitters/deflectors 433 and 435 include micro-machined or etched angled surfaces in back side 147 of semiconductor substrate 153. In one embodiment, the etched or micro-machined surfaces of first and second beam splitters/deflectors 433 and 435 are then back filled with CVD oxide and are partially coated with a reflective material 505 and 507, respectively. In this manner, first and second beam splitters/deflectors 433 and 435 may steer and deflect light in the manner described. In one embodiment, reflective material(s) 505 and 507 include materials such as, for example but not limited to, aluminum.

While optical input/output devices 117 and 119 have been described as optical demodulators in the example above, various embodiments are also applicable to optical modulators that are used to optically communicate modulated light beams between nodes of the integrated circuit device 101 in a similar manner.

FIG. 6A is an illustration of a cross-section of one embodiment showing how light source 127 may be attached to back side 147 of semiconductor substrate 153 of FIG. 5. In one embodiment, light source 127 is coupled to receive power and/or control through via 601 from front side 145 of integrated circuit die 101. In one embodiment, light source 127 may be modulated through via 601. In one embodiment, via 601 is etched through semiconductor substrate 153 and is filled with a conductive material, such as, for example but not limited to, aluminum. As a result, in one embodiment, light source 127 may be powered by the same power source that is used to power integrated circuit die 101.

FIG. 6B is an illustration of a cross section of another embodiment showing how light source 127 may be attached to back side 147 of semiconductor substrate 153 of FIG. 5. In one embodiment, light source 127 is coupled to receive power from a power supply 603, which is external to integrated circuit die 101. As a result, in one embodiment, light source 127 may be powered separately from integrated circuit die 101. In one embodiment, light source 127 is simply attached with thermal grease or epoxy into an etched or micro-machined groove in back side 147 of semiconductor substrate 153 of integrated circuit die 101.

Figure 4A:
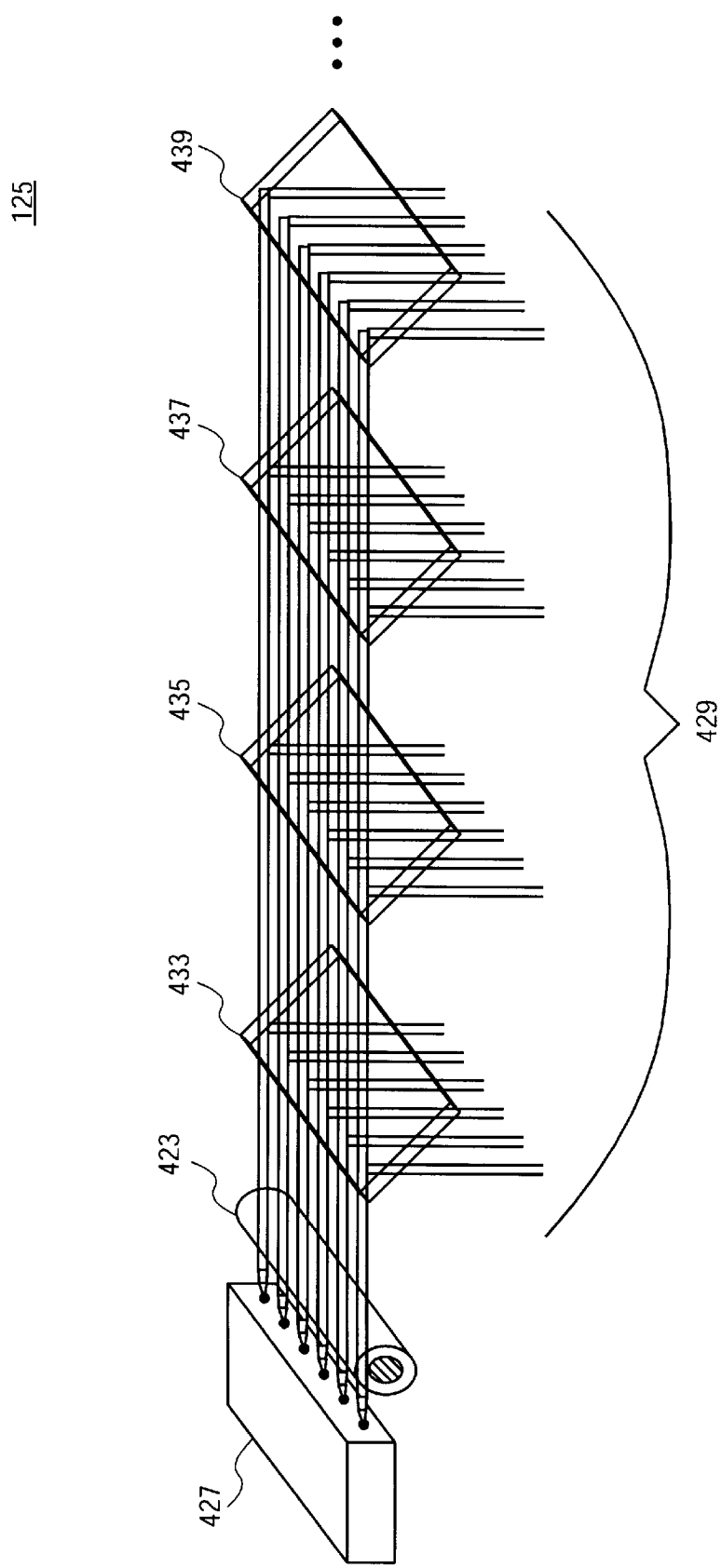
FIG. 4A is a three dimensional illustration of one embodiment of a light source and an optical assembly generating a plurality of light beams in accordance with one embodiment.
Figure 4B:
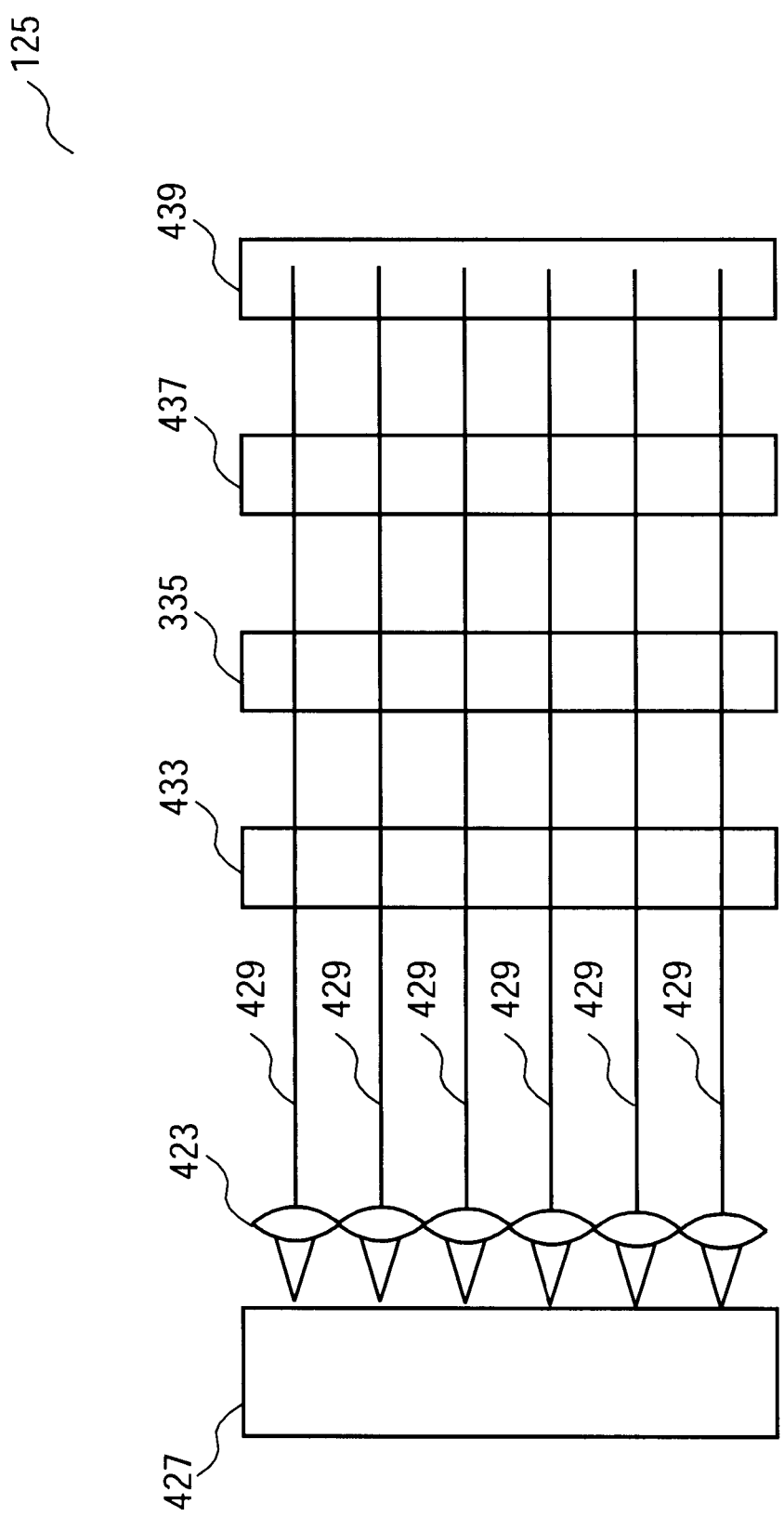
FIG. 4B is a top view illustration of one embodiment of a light source and an optical assembly that generates a plurality of light beams in accordance with one embodiment.

In accordance with the above-described embodiments, input/output signals, including bus signals, may be optically communicated within an integrated circuit device and/or among a plurality of integrated circuit devices. FIGS. 4A and 4B more particularly illustrate examples of the manner in which an optical bus may be implemented for one embodiment.

FIG. 4A is a three dimensional illustration of one embodiment of an optical assembly 125 and a light source 427. Optical assembly 125 of FIG. 4A includes a plurality of lenses 423, a first beam splitter/deflector 433, a second beam splitter/deflector 435, a third beam splitter/deflector 437 and a fourth beam splitter/deflector 439. In one embodiment, light source 427 is a laser strip diode that includes a plurality of light sources, each of which is used to generate a corresponding one of a plurality of light beams 429.

In one embodiment, light source 427 includes N emitting elements where each one of the plurality of light beams 429 in one embodiment corresponds to one bit line of an N bit optical bus. For instance, if the specific optical bus structure is 256 bits wide, then N is equal to 256.

In another embodiment, light source 427 includes a single beam emitting laser diode and a hologram, a diffractive element, or other means of providing multiple beams from a single light source, to generate the plurality of light beams 429. In operation, the single laser beam generated by light source 427 is passed through the hologram or diffractive optics element which splits the single beam into N beams for an N-bit wide optical bus or other application using multiple beams. Use of the hologram to provide the plurality of beams 429 may result in added flexibility in the optical bus layout as well as increased reliability. Such a diffractive element may also be used with the light sources of one or more of the embodiments described above to provide multiple light beams from a single light source.

As shown in the embodiment illustrated in FIG. 4A, first beam splitter/deflector 433 splits the plurality of light beams 429, directs at least a portion of each of the light beams 429 to one or more corresponding receivers, and directs at least a portion of light beams 429 to second beam splitter/deflector 435. Second, third and fourth beam splitter/deflectors 435, 437, and 439, respectively, operate in a manner similar to the first beam splitter/deflector as shown in FIG. 4A. If the fourth beam splitter/deflector 439 is the last beam splitter/deflector in the optical assembly, the fourth beam splitter/deflector may not split the beams 429, but rather will deflect the entire portion of the beams received by the fourth beam splitter/deflector to corresponding receiver(s). It is appreciated that other embodiments of optical assembly 125 may include a greater number or a fewer number of beam splitters/deflectors to split and/or deflect the plurality of light beams 429 in the desired manner.

For one embodiment, the receivers for this embodiment may be corresponding input/output nodes including optical demodulators on one or more integrated circuit devices. For another embodiment, the receivers may include one or more optical assemblies similar to the arrangements illustrated in FIGS. 1A, 1B, 2A, 2B, 3A, 3B and 5. Further, optical assemblies similar to those illustrated in these Figures may be used in other embodiments to route the plurality of light beams 429 among the corresponding optical input/output devices of an optical bus. It is appreciated that the optical arrangement shown in FIG. 4A demonstrates the expandability of various embodiments to multiple integrated circuit chips and a plurality of optical input/output devices distributed along an N bit optical bus.

FIG. 4B is a top view illustration of one embodiment of optical assembly 125 and light source 427 of FIG. 4A. As shown, a plurality of lenses 423 collimates and focuses each of the light beams 429. For one embodiment, each of light beams 429 is then split and/or deflected through the back side of a semiconductor substrate of an integrated circuit die to a corresponding optical input/output device (not shown) by the beam splitter/deflectors 433, 435, 437 and 439 as described above.

Figure 7:
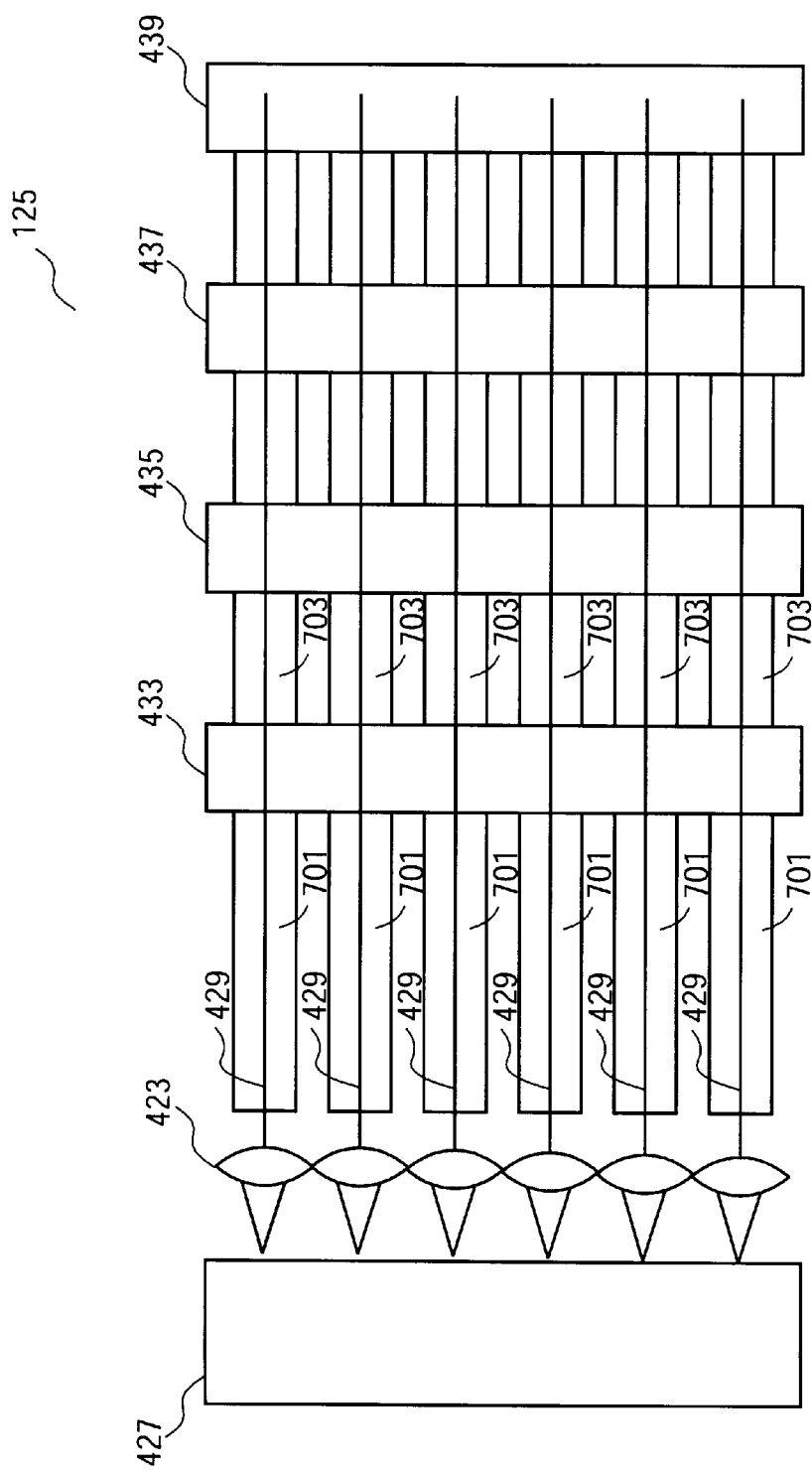
FIG. 7 is a top view illustration of a light source and an optical assembly with the plurality of light beams passing through channels in the semiconductor substrate in accordance with another embodiment.

FIG. 7 is a top view illustration of one embodiment of an optical bus implemented using a light source 427 and optical assembly 125 similar to the corresponding elements of FIG. 5. Light source 427 generates a plurality of light beams 429 each corresponding to one bit of an N bit wide optical bus which are focused, collimated, split and/or deflected as described above.

As shown in FIG. 7, however, optical assembly 125 includes a first plurality of channels 701 disposed between light source 427 and lenses 423 and first beam splitter/deflector 433 and a second plurality of channels 703 disposed between first beam splitter/deflector 433 and second beam splitter/deflector 435. As shown, there is also a plurality of channels between each of the beam splitters/deflectors 433, 435, 437 and 439 along each respective path of the plurality of light beams 429.

In one embodiment, the channels of FIG. 7, including the channels 701 and 703, may be etched or micro-machined into the back side of one or more semiconductor substrates as described above in reference to FIG. 5. Further, for one embodiment, the channels may be filled with a material that is optically transparent to the wavelength of the light provided by the light source 427. For example, where the light source 427 generates infrared light beam(s), the channels may be filled with polysilicon or another infrared-transparent material. In one embodiment, the channels are back filled with polysilicon, chemical vapor deposition (CVD) grown diamond, optical fiber waveguides, polymer films, or other similar infrared- or near infrared-transparent materials. Further, for one embodiment, the channels may form waveguides.

The channels, including the channels 701 and 703 enable the light beams 429 to travel along the back side(s) of the one or more semiconductor substrates in a corresponding channel. In this manner, the plurality of channels 701 and 703 help to reduce the amount of infrared absorption by the substrate thereby improving efficiency of the infrared light source 427.

For other embodiments, particularly for embodiments for which input/output signals, including bus signals, are communicated between two or more integrated circuit devices, optical fiber(s) and/or waveguide link(s) may be used to route one or more light beams between beam splitters/deflectors. In this manner, it is not necessary to have a direct line of sight between a light source and a splitter/deflector and/or between successive splitter/deflectors, for example. In FIG. 4A, for example, the light beams 429 may be routed from light source 427 to and between splitter/deflectors 433, 435, 437 and 439, respectively. Optical fibers and/or waveguide links may also be used for other embodiments described above.

Using one or more of the above-described optical input/output approaches, there is a reduced need to drive large external capacitive loads. In this manner, smaller input/output driver circuitry may be used potentially resulting in a smaller integrated circuit die and reduced power consumption. Furthermore, by optically communicating input/output signals between integrated circuit nodes in accordance with various embodiments, the round trip delay of such signals may also be reduced, potentially resulting higher integrated circuit performance.

Another benefit of the optical input/output approach of some embodiments is a reduction in noise due to ground bouncing and other effects commonly associated with electrical input/output signals. In addition, in accordance with some embodiments, there is no longer a need to place input/output circuitry around the perimeter of an integrated circuit die because optical nodes, unlike electrical input/output nodes, can be placed almost anywhere on the die. Removal of this constraint increases layout flexibility and may also provide for a smaller die area.

Figure 8:
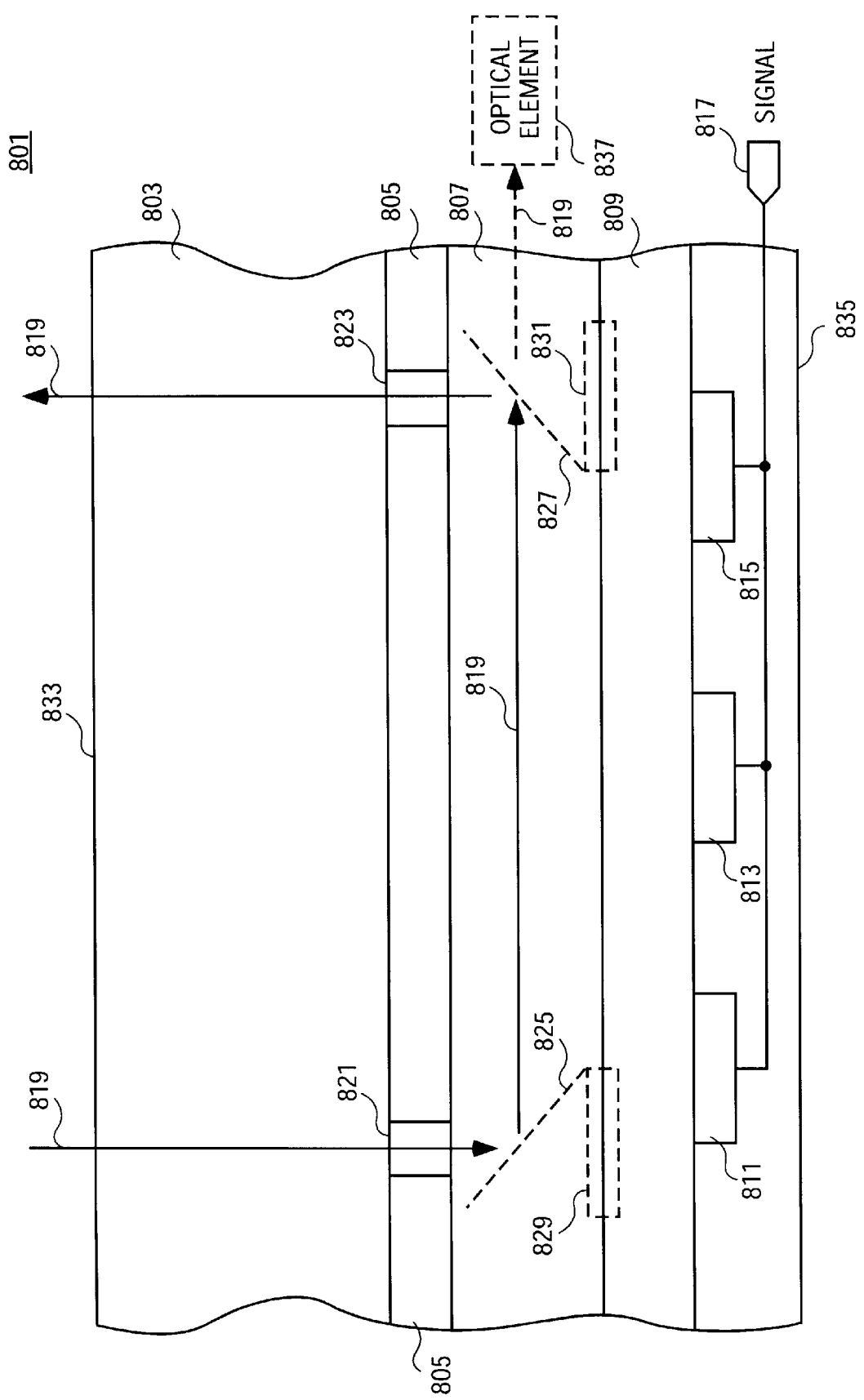
FIG. 8 shows a cross-section of a waveguide optical modulator in accordance with one embodiment.

A cross-section of one embodiment of a waveguide optical modulator 801 that may be used as an optical interconnection for one or more of the above-described embodiments is shown in FIG. 8. For example, the optical modulator 801 may be used for one or more of optical modulators 115 and 121 in FIGS. 2A–B and 3A–B.

As shown in FIG. 8, one embodiment of optical modulator 801 is included in a semiconductor die having an insulating layer 805 disposed between a semiconductor layer 807 and a semiconductor substrate 803. Thus, access to semiconductor layer 807 from the back side 833 of the semiconductor substrate 803 is through insulating layer 805.

In one embodiment, semiconductor layer 807 is disposed between insulating layer 805 and another insulating layer 809 and conductors 811, 813 and 815 are disposed proximate to insulating layer 809. The conductors 811, 813 and 815 form a plurality of capacitors that modulate free carriers in semiconductor layer 807 in response to signal 817. The signal 817 may be any electrical signal that is communicated by the integrated circuit including the conductors 811, 813 and 815.

Semiconductor layer 807 is heavily doped in one embodiment and is configured as an optical waveguide. Also, in one embodiment, insulating layer 805 includes oxide, such as for example silicon dioxide, and semiconductor layer 807 includes one of single crystal or polycrystalline silicon.

In operation, light 819, which may be in the form of an infrared light beam for one embodiment, enters optical modulator 801 through the back side 833 of semiconductor substrate 803. Light 819 then passes through insulating layer 805 to reach the waveguide-configured semiconductor layer 807 of optical modulator 801. In one embodiment, light 819 is then guided along and through the waveguide-configured semiconductor layer 807, back through insulating layer 805, through semiconductor substrate 803 and back out the back side 833 as indicated by the arrows.

In one embodiment, light 819 is directed along and through waveguide-configured semiconductor layer 807 by one or more of a deflector 825 or a diffractive grating 829. In one embodiment, deflector 825 is etched at near 45 degrees and then a reflecting surface (e.g. titanium silicide, aluminum, etc.) is deposited thereon. Also in one embodiment, light 819 is directed back out of waveguide-configured semiconductor layer 807 using one or more of a deflector 827 or a diffractive grating 831.

For embodiments in which light 819 enters and exits waveguide-configured semiconductor layer 807 by passing back and forth through an interface between semiconductor substrate 803 and insulating layer 805 and another interface between insulating layer 805 and semiconductor layer 807, light 819 may be attenuated to an undesirable extent. This undesirable attenuation is a consequence of the different indices of refraction between semiconductor substrate 803, insulating layer 805 and semiconductor layer 807. For example, for one embodiment, insulating layers 805 and 809 may both have indexes of refraction of approximately 1.5 and semiconductor substrate 803 and semiconductor layer 807 may both have indexes of refraction of approximately 3.5.

To remedy this issue, one embodiment uses first and second optical conduits 821 and 823 disposed in insulating layer 805. For this embodiment, light 819 received through the back side 833 of semiconductor substrate 803 enters the semiconductor layer 807 through optical conduit 821. Similarly, light 819 exits waveguide-configured semiconductor layer 807 to enter semiconductor substrate 803 through optical conduit 823.

In one embodiment, optical conduits 821 and 823 are formed of a substance having an index of refraction that is substantially equal to the indexes of refraction of semiconductor substrate 803 and semiconductor layer 807. In one embodiment, semiconductor substrate 803, semiconductor layer 807 and optical conduits 821 and 823 each include one of either single crystal or polycrystalline silicon and have an index of refraction of approximately 3.5. As a result, in one embodiment, light 819 travels back and forth through semiconductor substrate 803, insulating layer 805 and semiconductor layer 807 without having to pass through interfaces between materials having substantially unequal indexes of refraction. In this manner, attenuation of light 819 may be substantially reduced in comparison with embodiments that do not include optical conduits 821 and 823.

In one embodiment waveguide-configured semiconductor layer 807 includes a material having an index of refraction different from the index of refraction of the semiconductor substrate 803. For this embodiment, the optical conduits 821 and 823 may be formed of a material having an index of refraction between the indexes of refraction of the semiconductor substrate 803 and the semiconductor layer 807. For example, the optical conduits 821 and 823 may include a material having an index of refraction equal to an average of or midpoint between the indexes of refraction of the semiconductor substrate 803 and the semiconductor layer. For this embodiment, optical conduits 821 and 823 serve as an anti-reflection coating between the semiconductor substrate 803 and the guiding semiconductor layer 807.

As described in more detail below, light 819 is modulated within semiconductor layer 807 in response to signal 817. In one embodiment, light 819 is modulated by free carriers within semiconductor layer 807 that are modulated by the conductors 811, 813 and 815 in response to the signal 817.

For example, FIG. 11A is a more detailed cross section illustration of a portion of the optical modulator 801 of FIG. 8. As shown in FIG. 11A, light 819 passes along and through the waveguide-configured semiconductor layer 807. In the embodiment illustrated in FIG. 11A, semiconductor layer 807 is doped N-type such that its free carriers are electrons 1137. In the embodiment illustrated in FIG. 11A, in response to a negative voltage from the signal 817, electrons 1137 are repelled away from conductor 813 to create a depletion region proximate to the conductor 813.

As a result, light 819 passes through the depletion region in semiconductor layer 807 without having to pass through an appreciable number of free carriers. Light 819 is therefore not unduly attenuated by electrons 1137 since they have been repelled away from conductor 813. Further, the lack of immediate contact between the conductor 813 and the semiconductor layer 807 due to the intervening insulator 809, also reduces the absorption of the light 819.

Figure 11B:
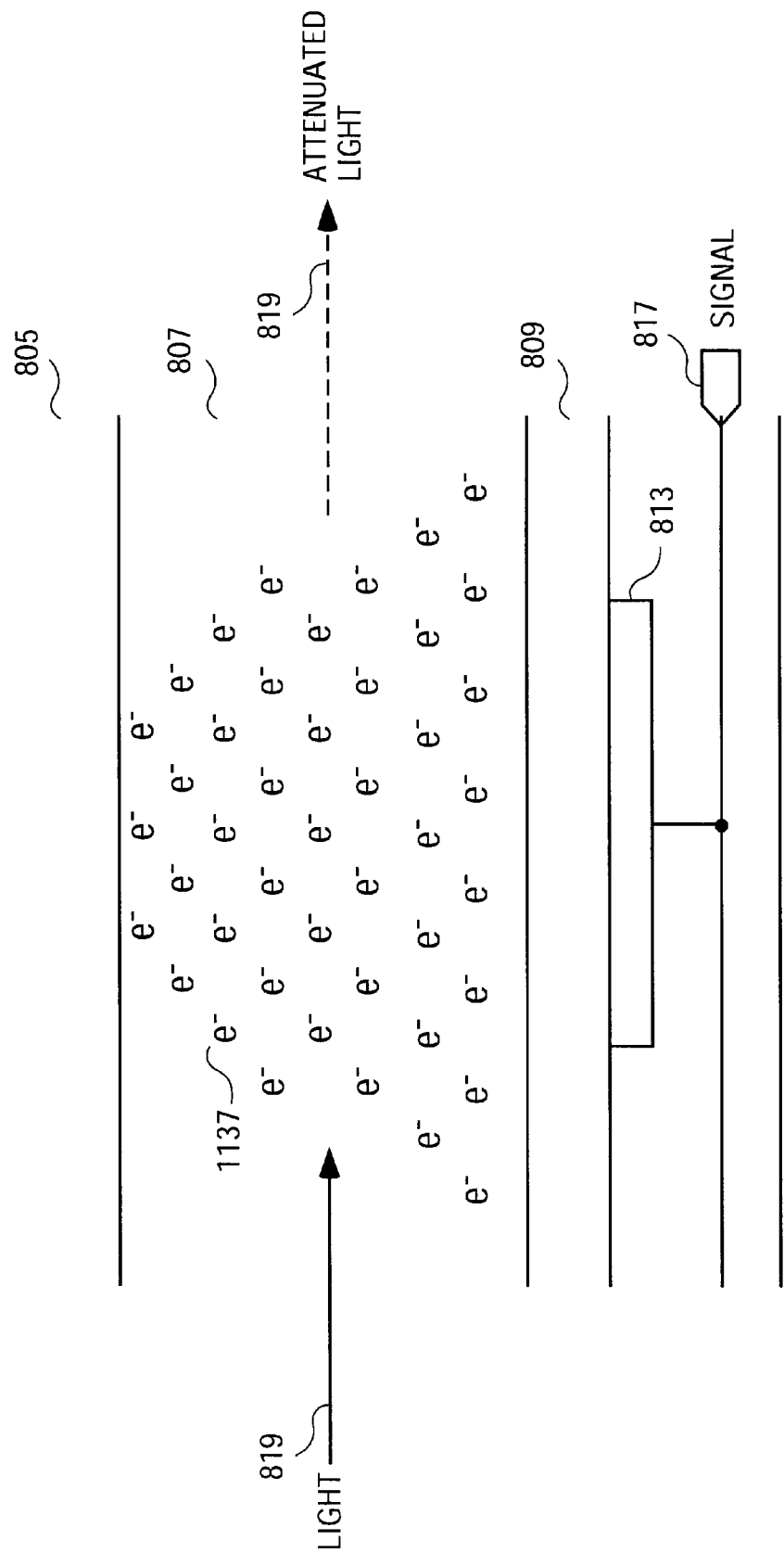
FIG. 11B shows a cross-section of one embodiment of the waveguide optical modulator of FIG. 8 operating in accumulation mode.

FIG. 11B is a cross-section illustrating the waveguide optical modulator 801 being operated in accumulation. In particular, assuming that semiconductor layer 807 is N-type, a positive voltage applied by signal 817 to conductor 813 causes electrons 1137 to be attracted to conductor 813. Accordingly, a relatively large number electrons 1137 are clustered in semiconductor layer 807 near conductor 813.

Light 819 that passes through the cluster of electrons 1137 when traveling along and through semiconductor layer 807 is attenuated by electrons 1137. The electrons 1137 attenuate the light 819 by converting some of the light 819 energy into electron energy. Thus, by switching between the depletion mode illustrated in FIG. 11A and the accumulation mode illustrated in FIG. 11B, light 819 can be modulated in response to signal 817.

Figure 11C:
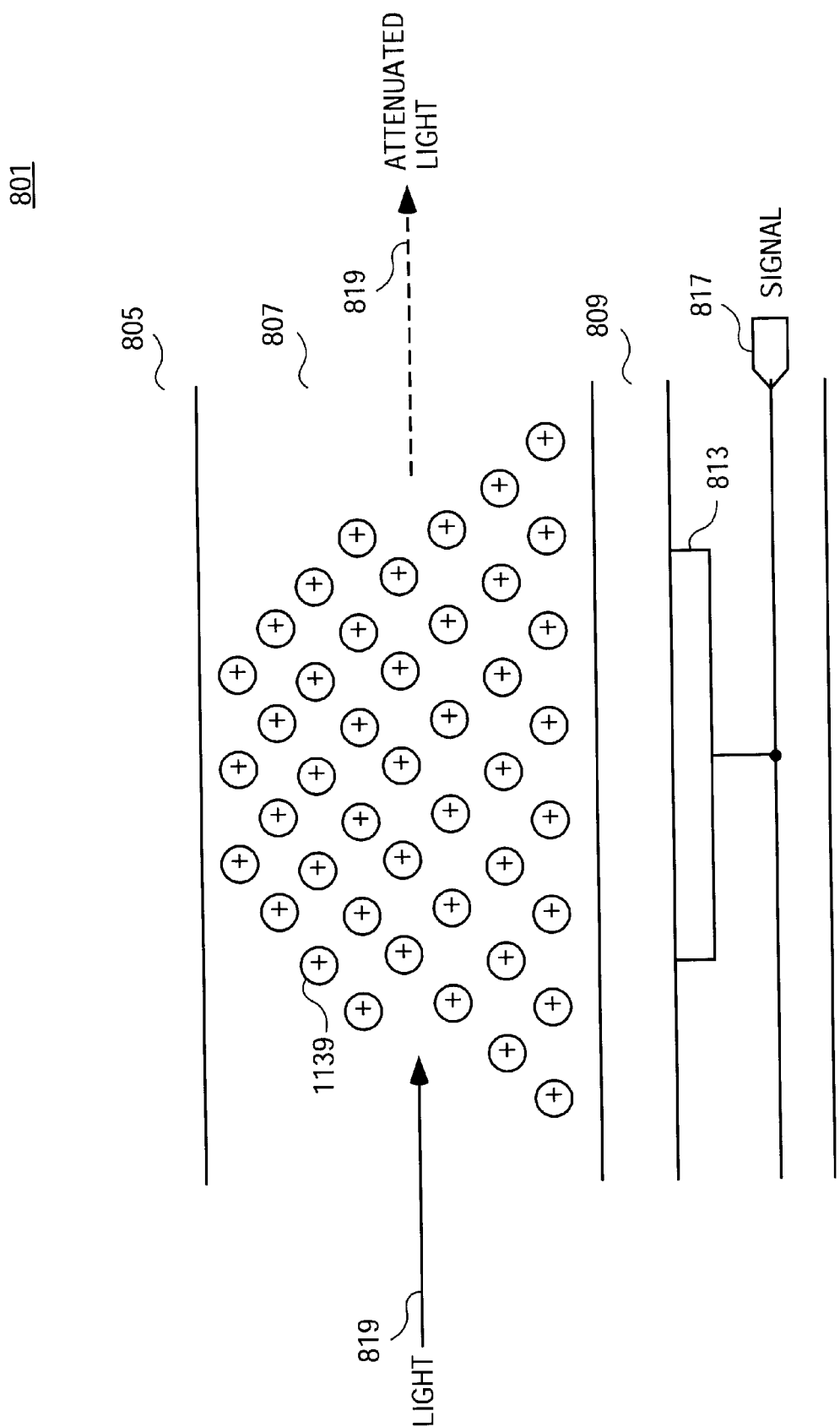
FIG. 11C shows a cross-section of one embodiment of the waveguide optical modulator of FIG. 8 operating in inversion mode.

FIG. 11C is a cross-section illustrating the waveguide optical modulator 801 being operated in inversion mode. In particular, assuming semiconductor layer 807 is N-type, a relatively large negative voltage applied to conductor 813 through signal 817 causes electrons (not shown) to be repelled from conductor 813 as described above. As a further result of the high negative voltage applied to the conductor 813, however, positively charged holes 1139 are attracted to and clustered around the conductor 813.

Consequently, light 819 passing along and through semiconductor layer 807 passes through the cluster of holes 1139 in semiconductor layer 807. Similar to the accumulation mode described above, the cluster of holes 1139 converts some of the light 819 energy into free carrier energy resulting in an attenuation of light 819 when waveguide optical modulator 801 operates in inversion mode. Therefore, in accordance with another embodiment, light 819 may be modulated in response to signal 817 by toggling between the depletion mode illustrated in FIG. 11A and the inversion mode illustrated in FIG. 11C.

It will be appreciated that, for another embodiment, P-type semiconductor could be used in place of the N-type semiconductor for semiconductor layer 807. Where P-type semiconductor is used for semiconductor layer 807, the polarity of the voltages and free carriers described above would be reversed.

Referring back to FIG. 8, the modulation depth of optical modulator 801 may be increased by using a greater number of conductors 811, 813 and 815 and/or by increasing the interaction length of waveguide configured semiconductor layer 807. The interaction length of the embodiment illustrated in FIG. 8, for example, may be considered to be the distance between optical conduits 821 and 823.

Figure 10:
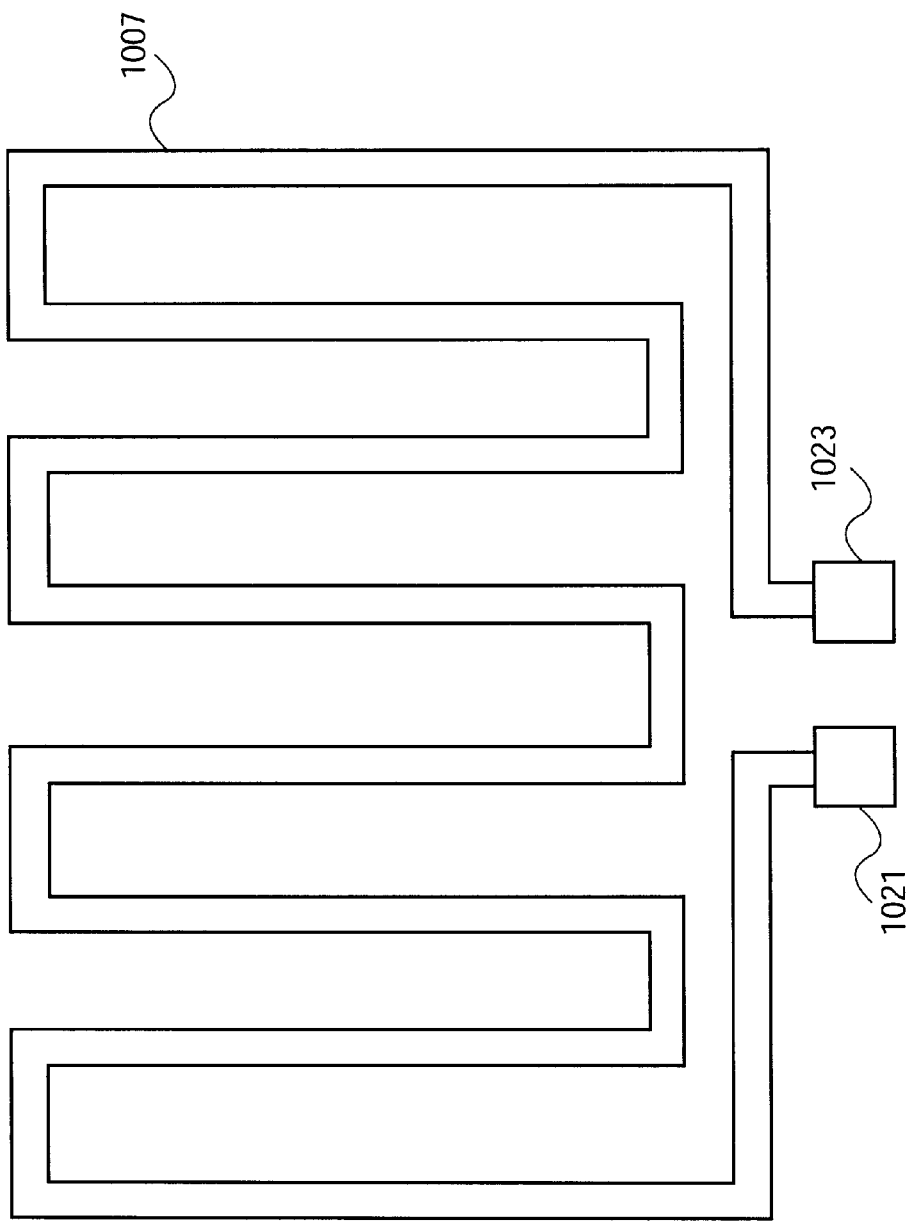
FIG. 10 is a top view illustration of one embodiment of a waveguide optical modulator.

To illustrate this point, FIG. 10 shows a top view of an optical modulator 1001 of one embodiment that is similar in construction and operation to the optical modulator 801 of FIG. 8. In the embodiment illustrated in FIG. 10, waveguide-configured semiconductor layer 1007 is optically coupled between optical conduits 1021 and 1023. As illustrated in FIG. 10, waveguideconfigured semiconductor layer 1007 is arranged in a "serpentine" pattern to increase the interaction length of optical modulator 1001 to increase modulation depth.

Referring again to FIG. 8, in one embodiment, the width and period of conductors 811, 813 and 815 are chosen using known techniques to improve modulation efficiency. In one embodiment, the periodicity of conductors 811, 813 and 815 is selected using known techniques to create λ/4 thicknesses of alternating carrier density in the semiconductor layer 807. This structure reflects light having the wavelength λ, much the same as dielectric stacks reflect light in some laser diodes. By varying the signal at the conductors 811, 813 and 815, the reflectivity of semiconductor layer 807 changes due to the changing index of refraction caused by the carrier modulation.

In another embodiment, the optical conduits 821 and 823 through the insulating layer of the present invention may be used for applications other than waveguide-based optical modulators. For one embodiment, for example, optical conduits 821 and 823 may be used to reduce reflections at interfaces between insulating layers and semiconductor layers where elements are optically coupled through such layers. For example, in another embodiment, waveguide configured semiconductor layer 807 may be used to optically couple an optical element 837, which may be any type of optical element, to the integrated circuit that includes the semiconductor layer 807. For example, light 819 may be optically communicated to optical element 837 through optical conduit 821 and semiconductor layer 807. In this embodiment, light 819 does not necessarily enter or exit semiconductor layer 807 through optical conduit 823.

Figure 9:
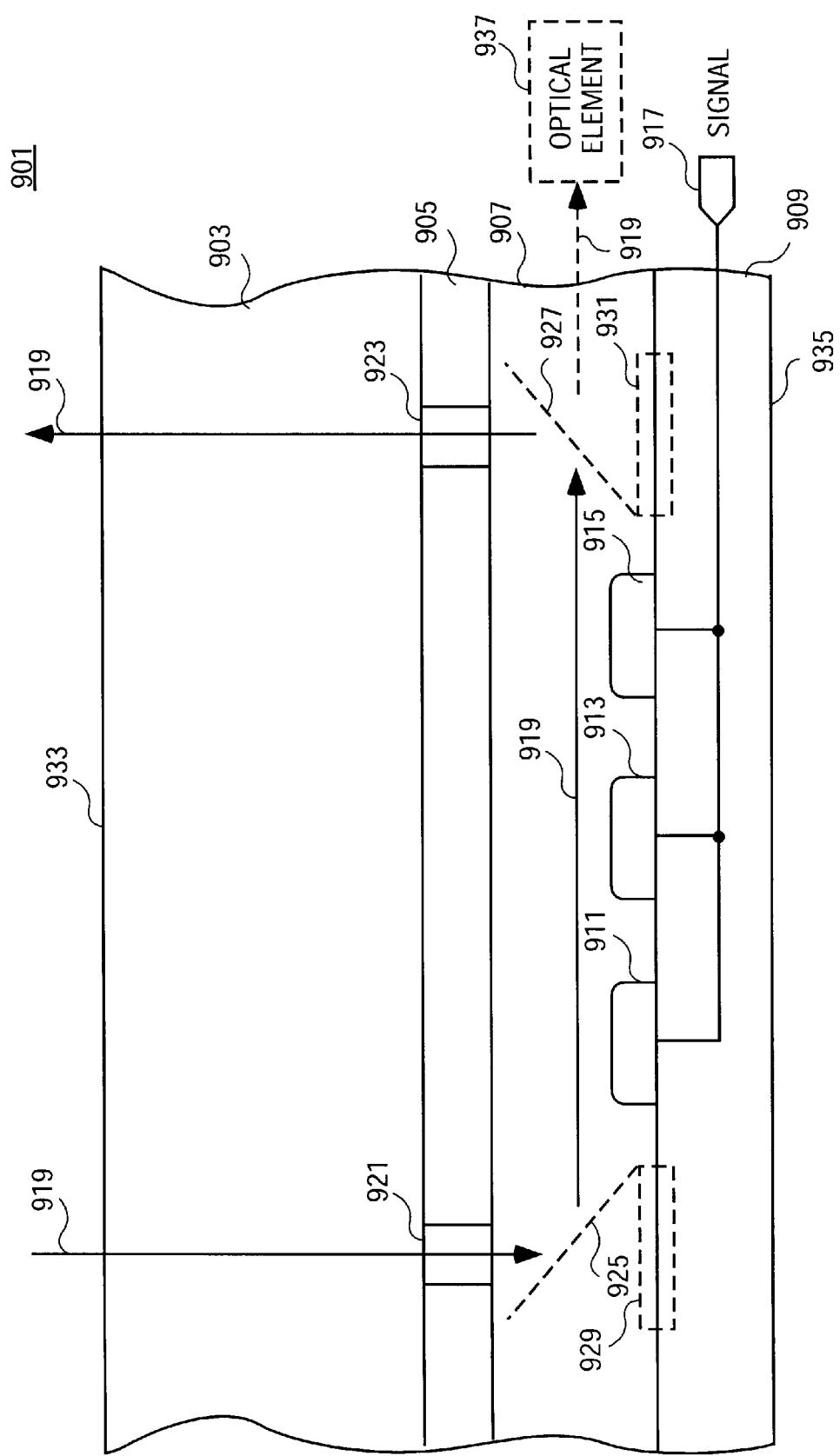
FIG. 9 shows a cross-section of another embodiment of a waveguide optical modulator.

FIG. 9 is an illustration of a cross-section of another embodiment of an optical interconnection configured as waveguide optical modulator 901. As shown in FIG. 9, optical modulator 901 includes an insulating layer 905 disposed between a semiconductor substrate 903 and a waveguide-configured semiconductor layer 907. Similar to optical modulator 801 of FIG. 8, optical modulator 901 of FIG. 9 also includes optical conduits 921 and 923 disposed in the insulating layer 905 that are similar in operation and construction to the optical conduits 821 and 823 of FIG. 8. Also, deflectors 925 and 927 and/or diffraction gratings 929 and 931 may be configured in a similar manner and perform functions similar to the corresponding elements of FIG. 8.

For one embodiment, however, semiconductor layer 907 includes a plurality of doped regions 911, 913 and 915 such that a junction is formed between the semiconductor layer 907 and the doped regions 911, 913 and 915. For the embodiment shown in FIG. 9, the doped regions 911, 913 and 915 are diffusion regions that form a plurality of P-N junctions between the semiconductor layer 907 and the diffusion regions 911, 913, and 915. The diffusion regions 911, 913 and 915 are coupled to receive a signal 917 that may be any electrical signal.

As described in more detail below with reference to FIGS. 12A and 12B, by appropriately biasing diffusion regions 911, 913 and 915, the amount and distribution of free carriers in semiconductor layer 907 may be modulated in response to signal 917. Modulating the amount and distribution of free carriers in the semiconductor layer 907 results in modulation of light 919 passing through waveguide-configured semiconductor layer 907.

Figure 12A:
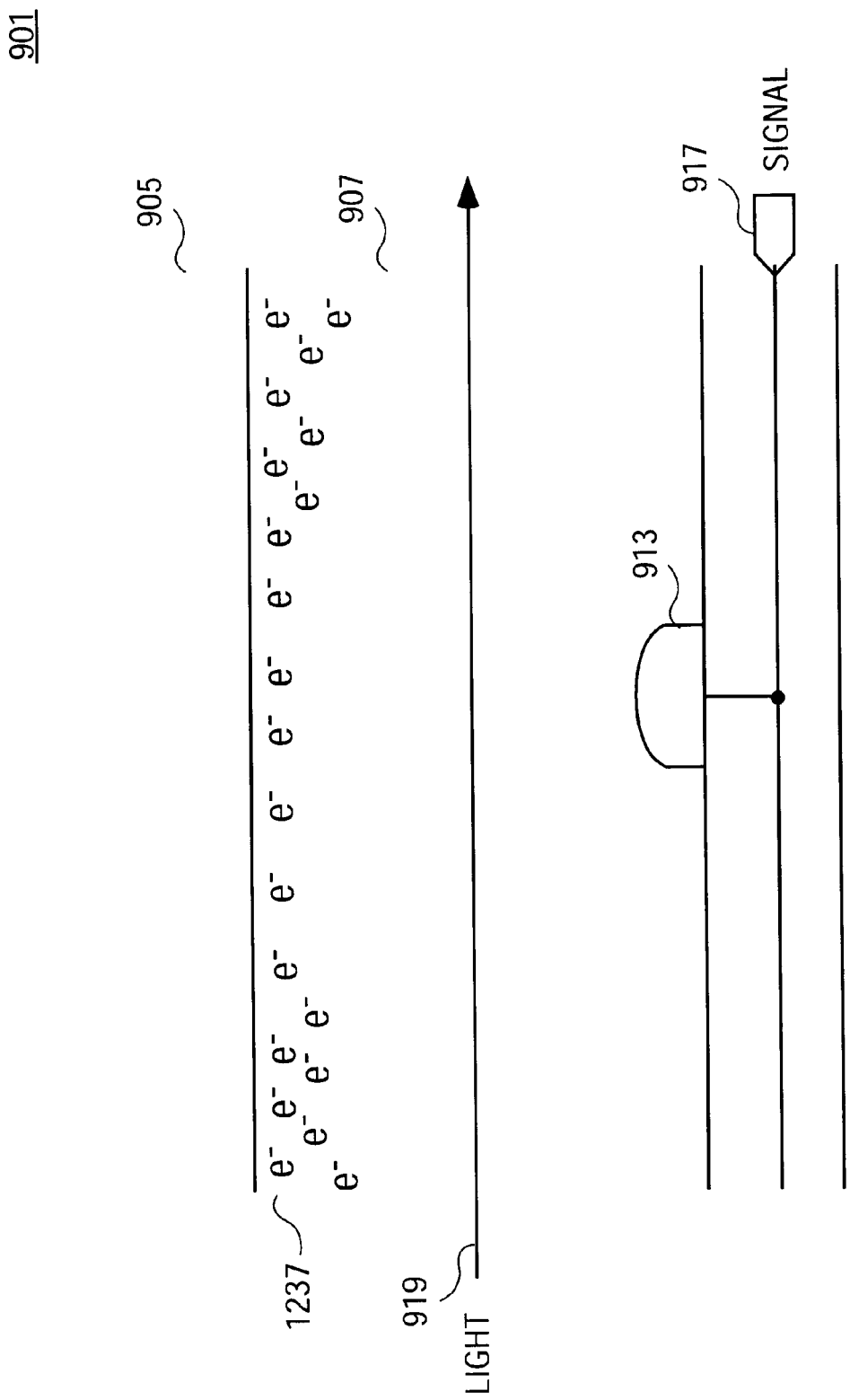
FIG. 12A shows a cross-section of the waveguide optical modulator of FIG. 9 operating in depletion mode.

FIG. 12A is a more detailed cross-section of the waveguide optical modulator 901 of FIG. 9 showing waveguide optical modulator 901 operating in depletion mode. In the embodiment illustrated in FIG. 12A, semiconductor layer 907 is N-type silicon and therefore, the free carriers of semiconductor layer 907 are electrons 1237. In the embodiment illustrated in FIG. 12A, diffusion region 913 includes P+type semiconductor material.

In response to a negative signal 917 voltage, electrons 1237 are repelled away from the P-N junction formed between diffusion region 913 and semiconductor layer 907 to form a depletion region near the diffusion region 913. As a result of formation of the depletion region near diffusion region 913, light 919 that passes through the semiconductor layer 907 travels through relatively few free carriers. In this manner, light 919 is not appreciably attenuated by electrons 1237.

Figure 12B:
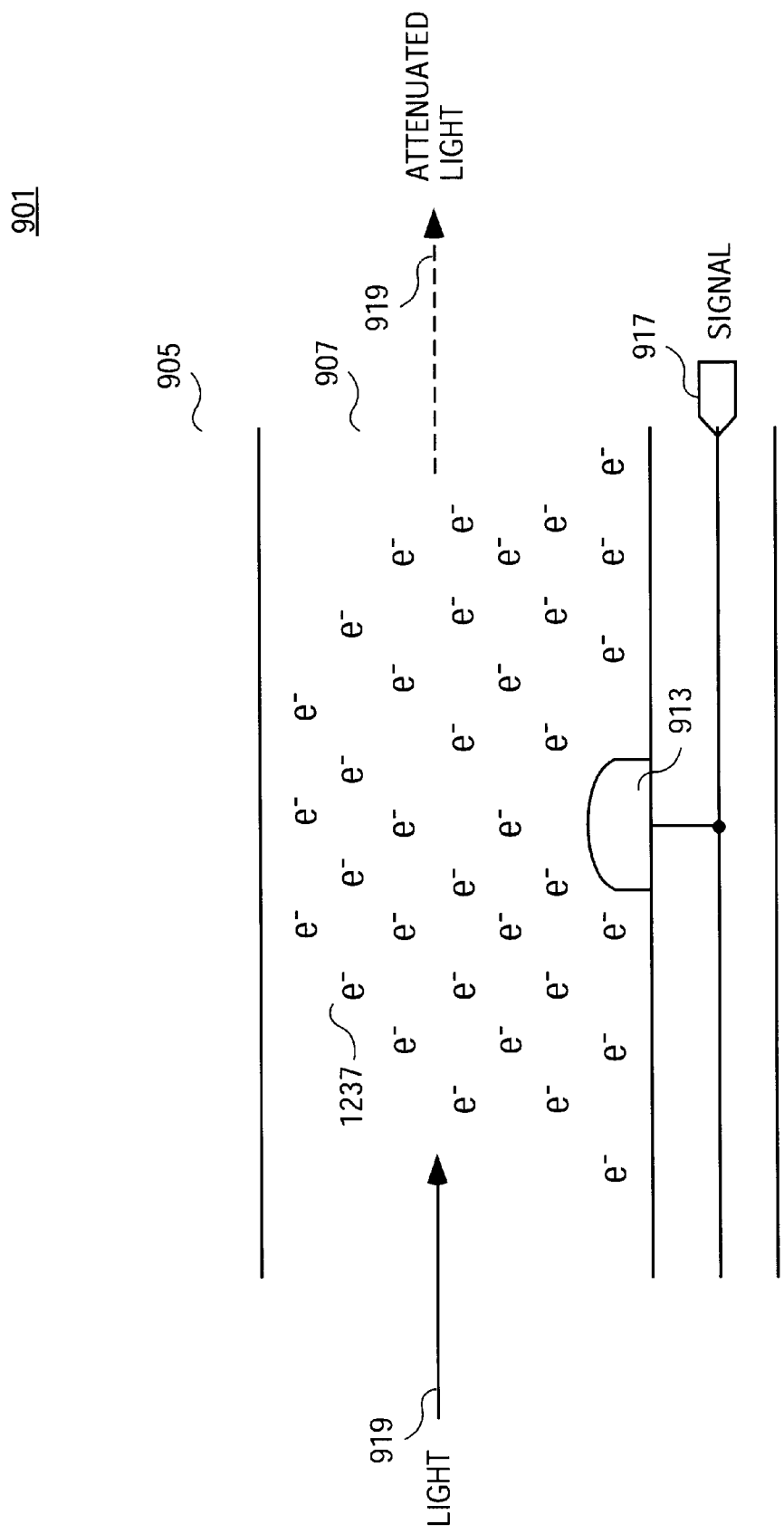
FIG. 12B shows a cross-section of the waveguide optical modulator of FIG. 9 operating with the depletion region collapsed.

FIG. 12B is a cross-section showing waveguide optical modulator 901 operating in response to a positive signal 917 voltage. In response to the positive signal 917 voltage, electrons 1237 cluster around diffusion region 913 in semiconductor layer 907 collapsing the depletion region. As a result, light 919 passes through a relatively large number of electrons 1237 when traveling along and through semiconductor layer 907. Light 919 is consequently attenuated when the waveguide optical modulator is operating in this mode. Therefore, by modulating the depletion region by forward- and reverse-biasing one or more P-N junctions between diffusion region 913 and semiconductor layer 907 in response to signal 917, light 919 passing through the semiconductor layer 907 can be modulated in response to signal 917.

In another embodiment, P-type semiconductor material may be used for semiconductor layer 907 and N+-type semiconductor may be used for diffusion region 913. In this embodiment, the free carriers of semiconductor layer 907 are holes instead of electrons. Thus, the polarities described above for signal 917 are reversed.

Referring back to FIG. 9, in one embodiment, the width and period of conductors 911, 913 and 915 are chosen using known techniques to improve modulation efficiency. In one embodiment, the periodicity of conductors 911, 913 and 915 is selected using known techniques to create $\lambda/4$ thicknesses of alternating carrier density in the semiconductor layer 907. In addition, it will be appreciated that by increasing the number of diffusion regions 911, 913 and 915 in semiconductor layer 907, the modulation depth of optical modulator 901 may be increased. In one embodiment, the width and period of diffusion regions 911, 913 and 915 may be chosen to reduce absorption and increase the electric field in the semiconductor layer 907. As described above, the modulation depth of optical modulator 901 may also be improved by increasing the interaction length of optical modulator 901.

It will be appreciated that, for other embodiments, a different type of doped region that forms a different type of junction with the semiconductor layer may be used in place of the above-described diffusion regions.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical interconnection, comprising:
   a first optical conduit disposed in a first insulating layer between a semiconductor substrate and a semiconductor layer of a semiconductor die to provide an optical path for light to travel through a back side of the semiconductor substrate, through the semiconductor substrate, through the first optical conduit to the semiconductor layer.

2. The optical interconnection of claim 1 further comprising a second optical conduit disposed in the first insulating layer between the semiconductor substrate and the semiconductor layer to provide an optical path for light to travel from the semiconductor layer, through the second optical conduit and through the semiconductor substrate.

3. The optical interconnection of claim 1 wherein the semiconductor substrate, the first optical conduit and the semiconductor layer each comprises one of single or polycrystalline silicon.

4. The optical interconnection of claim 1 wherein the semiconductor substrate, the first optical conduit and the semiconductor layer each have indices of refraction substantially equal to one another.

5. The optical interconnection of claim 1 wherein an index of refraction of the first optical conduit is between an index of refraction of the semiconductor substrate and an index of refraction of the semiconductor layer.

6. The optical interconnection of claim 1, wherein the semiconductor layer comprises an optical waveguide optically coupled to the first optical conduit.

7. The optical interconnection of claim 6 further comprising an optical modulator coupled to receive a signal, the optical modulator including the optical waveguide, the optical modulator to modulate light received through the semiconductor substrate through the first optical conduit in response to the signal.

8. The optical interconnection of claim 1 further comprising
   a conductor coupled to receive a signal, the conductor to modulate free carriers in the semiconductor layer in response to the signal.

9. The optical interconnection of claim 8 wherein the conductor is included in a capacitor coupled to modulate free carriers in the semiconductor layer in response to the signal.

10. The optical interconnection of claim 1 wherein the semiconductor layer includes a doped region coupled to receive a signal and to modulate free carriers in the semiconductor layer in response to the signal.

11. The optical interconnection of claim 1, wherein the semiconductor layer includes one of a deflector or diffractive optics optically coupled to the first optical conduit to guide light received from the first optical conduit through the semiconductor layer.

12. A method for directing light in a semiconductor die, the method comprising steps of:
   receiving the light through a back side of a semiconductor substrate, through the semiconductor substrate of the semiconductor die; and
   directing the light to a semiconductor layer through a first optical conduit disposed in a first insulating layer between the semiconductor substrate and the semiconductor layer.

13. The method of claim 12 further including a step of
   directing the light from the semiconductor layer to the semiconductor substrate through a second optical conduit disposed in the first insulating layer.

14. The method of claim 12 further including a step of modulating the light directed to the semiconductor layer in response to a signal.

15. The method of claim 14 wherein the step of modulating the light includes the step of modulating free carriers in the semiconductor layer in response to the signal.

* * * * *